(12) United States Patent
Lapham et al.

(10) Patent No.: US 12,265,096 B2
(45) Date of Patent: Apr. 1, 2025

(54) REAGENT DELIVERY AND WASTE MANAGEMENT SYSTEM

(71) Applicant: Myriad Women's Health, Inc., South San Francisco, CA (US)

(72) Inventors: Kyle Allen Lapham, San Francisco, CA (US); Peter Kingman Turner, Daly City, CA (US); Nathan Phillip Eldridge, San Francisco, CA (US)

(73) Assignee: Myriad Women's Health, Inc., South San Francisco, CA (US)

( * ) Notice: Subject to any disclaimer, the term of this patent is extended or adjusted under 35 U.S.C. 154(b) by 922 days.

(21) Appl. No.: 17/235,643

(22) Filed: Apr. 20, 2021

(65) Prior Publication Data

US 2021/0239726 A1    Aug. 5, 2021

Related U.S. Application Data

(62) Division of application No. 15/879,117, filed on Jan. 24, 2018, now Pat. No. 11,016,110.

(Continued)

(51) Int. Cl.
| | |
|---|---|
| *G01N 35/10* | (2006.01) |
| *B01L 3/00* | (2006.01) |
| *F04B 49/06* | (2006.01) |
| *F04B 49/22* | (2006.01) |
| *G01N 35/00* | (2006.01) |

(52) U.S. Cl.
CPC ............ *G01N 35/1002* (2013.01); *B01L 3/52* (2013.01); *F04B 49/065* (2013.01); *F04B 49/22* (2013.01); *G01N 35/1004* (2013.01); *B01L 2200/082* (2013.01); *B01L 2200/16* (2013.01); *B01L 2300/0627* (2013.01); *B01L 2300/0858* (2013.01); *B01L 2400/0475* (2013.01); *B01L 2400/049* (2013.01); *B01L 2400/06* (2013.01); *G01N 2035/00277* (2013.01)

(58) Field of Classification Search
CPC ........... G01N 35/1002; G01N 35/1004; G01N 2035/00277; B01L 3/52; B01L 2200/082; B01L 2200/16; B01L 2300/0627; B01L 2300/0858; B01L 2400/0475; B01L 2400/049; B01L 2400/06; F04B 49/065; F04B 49/22
See application file for complete search history.

(56) References Cited

U.S. PATENT DOCUMENTS

| 2,943,635 A | 7/1960 | Greer | |
|---|---|---|---|
| 5,383,574 A * | 1/1995 | Raphael | ................ G01F 11/284 222/64 |

(Continued)

OTHER PUBLICATIONS

Elecrow, Non-contact liquid level switch, retrieved on May 30, 2024 from https://www.elecrow.com/ non-contact-liquid-level-switch. html (Year: 2016).*

*Primary Examiner* — Jill A Warden
*Assistant Examiner* — Alex Ramirez
(74) *Attorney, Agent, or Firm* — Foley & Lardner LLP

(57) ABSTRACT

Reagent delivery systems, which can include a reagent trough and a pump system, are useful for delivering liquids to a laboratory workbench. Processing samples on the laboratory workbench can result in a large amount of liquid waste. Described herein are reagent troughs, pump systems, reagent delivery systems, waste management systems, and methods of using the same.

13 Claims, 5 Drawing Sheets

Related U.S. Application Data

(60) Provisional application No. 62/450,840, filed on Jan. 26, 2017.

(56) References Cited

U.S. PATENT DOCUMENTS

| | | |
|---|---|---|
| 6,142,015 A | 11/2000 | Getman |
| 9,339,817 B2 | 5/2016 | Lapham |
| 2004/0131516 A1 | 7/2004 | Jackson |
| 2009/0277980 A1 | 11/2009 | Otte |
| 2011/0073548 A1 | 3/2011 | Williams |
| 2013/0337432 A1 | 12/2013 | Cook |
| 2014/0314583 A1 | 10/2014 | Wilkens |
| 2016/0045918 A1* | 2/2016 | Lapham ............... G01N 35/028 506/40 |
| 2016/0312804 A1 | 10/2016 | Cox |

* cited by examiner

REAGENT DELIVERY AND WASTE MANAGEMENT SYSTEM

CROSS-REFERENCE TO RELATED APPLICATION

This application is a divisional of U.S. patent application Ser. No. 15/879,117, filed on Jan. 24, 2018, which claims priority from U.S. Provisional Application Ser. No. 62/450,840, filed on Jan. 26, 2017, the entire contents of each of which are incorporated herein by reference.

TECHNICAL FIELD

The present invention relates to reagent delivery systems and waste management systems, and methods of using the same.

BACKGROUND

High-throughput sample processing systems, such as the system described in U.S. Pat. No. 9,339,817, are able to prepare a large number of clinical samples for assays without substantial human interaction. Sample preparation can include, for example, isolating nucleic acids from biological samples (such as blood or saliva). Nucleic acid isolation often includes mixing the biological samples with one or more buffers or other liquids to lyse cells, bind nucleic acids to a surface, wash proteins from the sample, and elute the nucleic acid form the surface. Sample processing steps can use a large volume of liquid reagents and generate a large volume of liquid waste, which may include chemical or biological waste.

The high-throughput sample processing systems often include numerous coordinated parts that are used to process the samples. Many of these parts are located on a laboratory workbench. The laboratory workbench is often crowded, thus limiting available space for large liquid reagent reservoirs and liquid waste containers. A worker is often needed to regularly refill reagent reservoirs or empty liquid waste containers on the laboratory workbench, risking spills, biological contamination, and exposing the worker to hazardous chemicals.

SUMMARY

Described herein is a reagent trough comprising a vessel comprising a bottom and a sidewall; a high-level liquid sensor; a low-level liquid sensor positioned to detect liquid at a lower level than the high-level liquid sensor; a first liquid port positioned lower than the high-level liquid sensor; and a second liquid port positioned lower than the first liquid port. In some embodiments, the high-level liquid sensor or the low-level liquid sensor is positioned above the vessel and is configured to detect a liquid level in the vessel. In some embodiments, the high-level liquid sensor or the low-level liquid sensor is an acoustic sensor or an optical sensor. In some embodiments, the high-level liquid sensor or the low-level liquid sensor is positioned on the sidewall of the vessel. In some embodiments, the high-level liquid sensor and the low-level liquid sensor is positioned on the sidewall of the vessel, and the low-level liquid sensor is positioned below the high-level liquid sensor. In some embodiments, the high-level liquid sensor contacts an inner face of the sidewall. In some embodiments, the high-level liquid sensor is a conductive sensor. In some embodiments, the high-level liquid sensor is a capacitive sensor. In some embodiments, the low-level liquid sensor does not contact an inner face of the sidewall. In some embodiments, the low-level liquid sensor is a capacitive sensor. In some embodiments, the low-level liquid sensor is a conductive sensor. In some embodiments, the second liquid port is positioned lower than the low-level liquid sensor.

In some embodiments, the first liquid port is positioned on the sidewall of the vessel. In some embodiments, the second liquid port is positioned on the sidewall of the vessel. In some embodiments, the reagent trough further comprises an overflow drain comprising an inlet and an outlet, the inlet positioned above the first liquid port. In some embodiments, the high-level liquid sensor is on the sidewall of the vessel and the inlet of the overflow drain is positioned at the same level or above the high-level liquid sensor. In some embodiments, the inlet of the overflow drain is perpendicular to the sidewall. In some embodiments, the outlet of the overflow drain is fluidly connected to a waste management system.

In some embodiments, the high-level liquid sensor and the low-level liquid sensor are connected to a data port.

In some embodiments, the first liquid port and the second liquid port are fluidly connected to a pump system.

Also described herein is a pump system comprising pump system comprising a first liquid reservoir port connected to a first pump by a first conduit; a first junction connected to the first pump by a second conduit; a first liquid supply port connected to the first junction by a third conduit; a second liquid supply port connected to a second junction by a fourth conduit; a control valve connecting the first junction and the second junction; a second pump connected to the second junction by a fifth conduit; and a second liquid reservoir port connected to the second pump by a sixth conduit. In some embodiments, the control valve is a stop flow valve.

In some embodiments, the pump system further comprises a one-way valve disposed along the second conduit.

In some embodiments, the pump system further comprises a data port connected to the control valve. In some embodiments, the data port is connected to the first pump and the second pump.

In some embodiments, the pump system further comprises a bubble sensor operable to detect bubbles in one or more of the conduits. In some embodiments, the bubble sensor is operable to detect bubbles in the fourth conduit, the fifth conduit, or the sixth conduit. In some embodiments, the bubble sensor is connected to the data port.

In some embodiments, the data port is connected to a computer system comprising a microprocessor, wherein the computer system is operable to control the control valve, the first pump, or the second pump.

In some embodiments, the pump system is contained within a housing. In some embodiments, the pump system further comprises a spill sensor disposed within the housing. In some embodiments, the spill sensor is connected to the data port.

Also described herein is a reagent delivery system comprising the pump system; a liquid reservoir fluidly connected to the first liquid reservoir port and the second liquid reservoir port; and a reagent trough fluidly connected to the first liquid supply port and the second liquid supply port. In some embodiments, the reagent trough comprises a vessel comprising a bottom and a sidewall; a high-level liquid sensor; a low-level liquid sensor positioned to detect liquid at a lower level than the high-level liquid sensor, a first liquid port positioned lower than the high-level liquid sensor, wherein the first liquid port is fluidly connected to the second liquid supply port of the pump system; and a second liquid port positioned lower than the first liquid port, wherein the second liquid port is fluidly connected to the first liquid supply port of the pump system.

In some embodiments of the reagent delivery system, the high-level liquid sensor or the low-level liquid sensor is positioned above the vessel and is configured to detect a liquid level in the vessel. In some embodiments, the high-level liquid sensor or the low-level liquid sensor is an acoustic sensor or an optical sensor. In some embodiments, the high-level liquid sensor or the low-level liquid sensor is positioned on the sidewall of the vessel. In some embodiments, the high-level liquid sensor and the low-level liquid sensor is positioned on the sidewall of the vessel, and the low-level liquid sensor is positioned below the high-level liquid sensor. In some embodiments, the high-level liquid sensor contacts an inner face of the sidewall. In some embodiments, the high-level liquid sensor is a conductive sensor. In some embodiments, the high-level liquid sensor is a capacitive sensor. In some embodiments, the low-level liquid sensor does not contact an inner face of the sidewall. In some embodiments, the low-level liquid sensor is a capacitive sensor. In some embodiments, the low-level liquid sensor is a conductive sensor. In some embodiments, the second liquid port is positioned lower than the low-level liquid sensor. In some embodiments, the first liquid port is positioned on the sidewall of the vessel. In some embodiments, the second liquid port is positioned on the sidewall of the vessel. In some embodiments, the reagent trough further comprises an overflow drain comprising an inlet and an outlet, the inlet positioned above the first liquid port. In some embodiments, the high-level liquid sensor is on the sidewall of the vessel and the inlet of the overflow drain is positioned at the same level or above the high-level liquid sensor. In some embodiments, the inlet of the overflow drain is perpendicular to the sidewall. In some embodiments, the outlet of the overflow drain is fluidly connected to a waste management system. In some embodiments, the high-level liquid sensor and the low-level liquid sensor are connected to a data port. In some embodiments, the high liquid sensor and the low liquid sensor are connected to a computer system comprising a microprocessor.

In some embodiments of the reagent delivery system, the pump system is operable to pump a liquid contained within the liquid reservoir to the reagent trough upon the low-level liquid sensor detecting an absence of liquid. In some embodiments, the liquid is pumped into the reagent trough through the second liquid port of the reagent trough. In some embodiments, the first pump is active and the control valve is closed upon the low-level liquid sensor detecting an absence of liquid. In some embodiments, the second pump is active upon the low-level liquid sensor detecting an absence of liquid. In some embodiments, the first pump and the second pump are deactivated upon the bubble sensor detecting bubbles in one or more of the conduits in the pump system.

In some embodiments of the reagent delivery system, the pump system is operable to drain a liquid contained within the reagent trough to the liquid reservoir upon the high-level liquid sensor detecting a liquid. In some embodiments, the liquid is actively drained by the pump system. In some embodiments, the liquid is drained from the reagent trough through the first liquid port of the reagent trough. In some embodiments, the second pump is activated and the control valve is open upon the high-level liquid sensor detecting the liquid.

In some embodiments of the reagent delivery system, the pump system is operable to recirculate liquid in the reagent trough by simultaneously pumping the liquid from the liquid reservoir to the reagent trough and pumping the liquid from the reagent trough to the liquid reservoir. In some embodiments, the liquid is pumped into the reagent trough through the second liquid port of the reagent trough, and the liquid is pumped out of the reagent trough through the first liquid port of the reagent trough during recirculation of the liquid. In some embodiments, the first pump and the second pump are active and the control valve is closed during recirculation of the liquid. In some embodiments, the pump system is operable to recirculate the liquid for a predetermined period of time. In some embodiments, the pump system is operable to recirculate the liquid at a predetermined frequency.

In some embodiments, the reagent delivery system further comprises a pipette system. In some embodiments, the pipette system is a multi-channel pipette system. In some embodiments, the pipette system is operable to draw a liquid from the reagent trough and dispense a liquid waste into a liquid waste input of a waste management system. In some embodiments, the liquid waste input is a gravity-based liquid waste input. In some embodiments, the gravity-based liquid waste input comprises a vessel and a lid comprising a plurality of apertures. In some embodiments, the waste management system further comprises a vacuum-based liquid waste input; and two or more liquid waste containers disposed to alternatively accept liquid waste from the gravity-based liquid input or the vacuum-based liquid waste input. In some embodiments, the waste management system further comprises a pump fluidly connected to the vacuum-based liquid waste input. In some embodiments, the waste management system further comprises a sterilizing liquid container operatively connected to at least one liquid waste container. In some embodiments, the waste management system is operable to treat the liquid waste with a sterilizing liquid from said sterilizing liquid container, and incubate the sterilizing liquid in the liquid waste for a predetermined period of time before disposing of the treated liquid waste. In some embodiments, the waste management system further comprises one or more scales for determining the amount of liquid waste collected by the one or more liquid waste containers. In some embodiments, the waste management system comprises a first liquid waste container operatively connected to the liquid waste input; a second liquid waste input operable to alternatively flow a second liquid waste into the first waste container or a second waste container.

Also described herein is a waste management system comprising a gravity-based liquid waste input; a vacuum-based liquid waste input operatively connected to a liquid aspirator and a liquid dispenser; a sterilizing liquid container operatively connected to at least one liquid waste container; two or more liquid waste containers disposed to alternatively accept liquid waste from said inputs, treat the liquid waste with a sterilizing liquid from said sterilizing liquid container, and incubate the sterilizing liquid in the liquid waste for a predetermined period of time before disposing of the treated liquid waste; and one or more scales for determining the amount of liquid waste collected by the one or more liquid waste containers. In some embodiments, the waste-management system further comprises a flush system operatively connected to the gravity-based liquid waste input. In some embodiments, the waste management system comprises a lead-lag pump system operable to pump the treated liquid waste out of the waste management system. In some embodiments, the waste management system further comprises one or more automatic pressure release valves.

Further described herein is a waste management system comprising a first liquid waste input connected to a first liquid waste container; a second liquid waste input connected to the first liquid waste container and a second liquid waste container; and a valve operable to alternatively direct liquid waste from the second liquid waste input to the first liquid waste container or the second liquid waste container. In some embodiments, the waste management system further comprises a pump operable to actively pump waste from the second liquid waste input into the first liquid waste container or the second liquid waste container. In some embodiments, the second liquid waste input is operatively connected to a liquid dispenser. In some embodiments, the first liquid waste input comprises a vessel and a lid comprising a plurality of apertures.

DETAILED DESCRIPTION

Figure 1A:
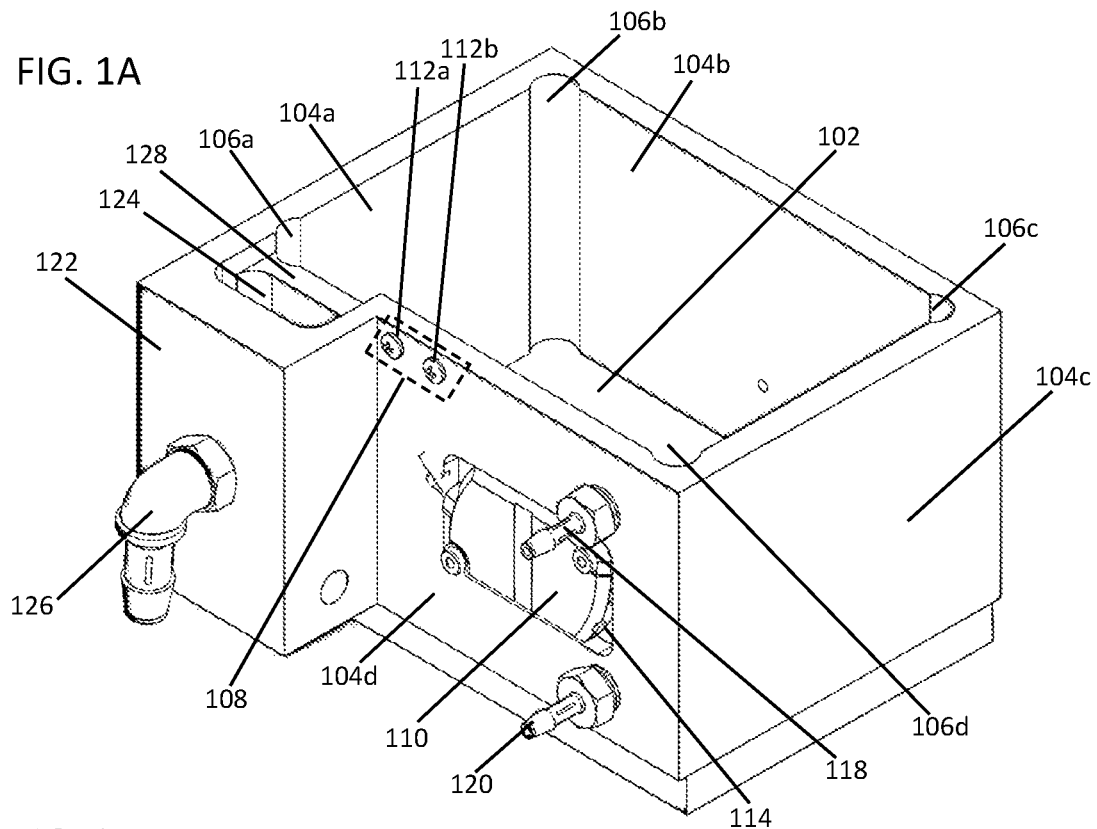
FIG. 1A illustrates one embodiment of a reagent trough.

Described herein is a reagent trough comprising a vessel comprising a bottom and a sidewall, a high-level liquid sensor, a low-level liquid sensor positioned to detect liquid at a lower level than the high-level liquid sensor, a first liquid port positioned lower than the high-level liquid sensor, and a second liquid port positioned lower than the first liquid port. The reagent trough can be placed on a laboratory workbench, which allows a liquid contained within the reagent trough to be easily accessible to a liquid handler. The reagent trough can be operably connected to a pump system, which can supply reagent to the reagent trough. The pump system can be operable to pump a liquid in to the reagent trough when the liquid in the reagent trough is below a predetermined level, and can be operable to drain the liquid from the reagent trough when the liquid in the reagent trough is above a predetermined level. In some embodiments, the pump system includes a first liquid reservoir port connected to a first pump by a first conduit, a first junction connected to the first pump by a second conduit, a first liquid supply port connected to the first junction by a third conduit, a second liquid supply port connected to a second junction by a fourth conduit, a control valve connecting the first junction and the second junction, a second pump connected to the second junction by a fifth conduit, and a second liquid reservoir port connected to the second pump by a sixth conduit.

Also described herein are waste management systems, which can be integrated with a reagent delivery system comprising a reagent trough and a pump system. For example, liquid can be provided to a laboratory workbench using the reagent delivery system, and the liquid can be used to process samples or clean equipment also present on the laboratory workbench. After the liquid is used, it is preferably safely removed from the laboratory workbench. The waste management system can be useful for removing the liquid waste. In some embodiments, the waste management system comprises a gravity-based liquid waste input, a vacuum-based liquid waste input operatively connected to a liquid aspirator and a liquid dispenser, a sterilizing liquid container operatively connected to at least one liquid waste container, two or more liquid waste containers disposed to alternatively accept liquid waste from said inputs, treat the liquid waste with a sterilizing liquid from said sterilizing liquid container, and incubate the sterilizing liquid in the liquid waste for a predetermined period of time before disposing of the treated liquid waste, and one or more scales for determining the amount of liquid waste collected by the one or more liquid waste containers. In some embodiments, the waste management system comprises a first liquid waste input operatively connected to a first liquid waste container, a second liquid waste input operatively connected to the first liquid waste container and a second liquid waste container, and a control valve operable to alternatively direct liquid waste from the second liquid waste input to the first liquid waste container or the second liquid waste container.

High-throughput sample processing systems, such as those described in U.S. Pat. No. 9,339,817, can process large numbers of samples using automated systems. Processing of sample can include, for example, extracting nucleic acids (DNA or RNA) from patient samples. High-throughput sample processing systems often use a large amount of liquid reagents, which results in a large amount of liquid waste. For example, nucleic acid extraction chemistry often uses binding buffers, wash buffers, and elution buffers. Re-usable processing equipment, such as liquid handlers (for example, pipettes, aspirators, and dispensers) are often sterilized with a sterilization solution, such as bleach, between contacting samples to avoid cross-contamination. Running out of reagent or sterilizing liquid would require operation of the high-throughput sample processing system to be suspended to allow for manual resupply. To allow for continuous operation of a high-throughput sample processing system, a continuous reagent source needs to be supplied. The high-throughput sample processing also generates a large amount of liquid waste resulting from used reagents or sterilizing liquid. Liquid waste can include sterilizing liquids, biohazardous waste, or chemical waste, which may be incompatible when mixed together or require different waste processing steps. Storing liquid waste generated by the high-throughput system may require interrupting operation of the high-throughput sample processing system to allow for manual waste removal. By including a waste management system, the liquid waste generated by the high-throughput sample processing system can be efficiently processed and removed.

Although the reagent delivery system (including a reagent trough and a pump system) and the waste management system described herein are preferably used with a high-throughput sample processing system, it is understood that the systems described herein provided herein are beneficial in any circumstance that would require regular access to a liquid or generation of liquid waste. For example, a reagent delivery system or a waste management system may be useful during a manufacturing process. The reagent delivery system or the waste management system are also beneficial in non-automated or non-high throughput processes. For example, a manually implemented process could use the reagent delivery system or the waste management system described herein to limit the need to refill a liquid on a workbench or treat or remove liquid waste.

As used herein, the singular forms "a," "an." and "the" include the plural reference unless the context clearly dictates otherwise.

Reference to "about" a value or parameter herein includes (and describes) variations that are directed to that value or parameter per se. For example, description referring to "about X" includes description of "X".

The term "control valve" is used to describe any valve that can control the amount of a liquid flow, including controlling a binary liquid flow (i.e., a stop-flow control). The term "control valve" includes a stop-flow valve.

It is understood that aspects and variations of the invention described herein include "consisting" and/or "consisting essentially of" aspects and variations.

Where a range of values is provided, it is to be understood that each intervening value between the upper and lower limit of that range, and any other stated or intervening value in that stated range, is encompassed within the scope of the present disclosure. Where the stated range includes upper or lower limits, ranges excluding either of those included limits are also included in the present disclosure.

It is to be understood that one, some or all of the properties of the various embodiments described herein may be combined to form other embodiments of the present invention. The section headings used herein are for organizational purposes only and are not to be construed as limiting the subject matter described.

Reagent Trough

In some embodiments, a reagent trough comprises a vessel comprising a bottom and a sidewall, a high-level liquid sensor on the sidewall, a low-level liquid sensor on the sidewall positioned lower than the high-level liquid sensor, a first liquid port positioned lower than the high-level liquid sensor; and a second liquid port positioned lower than the first liquid port. Liquid (e.g., a reagent or a sterilizing liquid) can be added to the vessel, and can be accessible to one or more liquid handlers. For example, the reagent trough can be placed on a laboratory workbench, where a high-throughput sample processing can access the liquid in the reagent trough. In some embodiments, the reagent trough has an open top, which allows a pipette system to dip a pipette tip into the liquid and draw the liquid from the reagent trough.

Components of the reagent trough, particularly components that contact the liquid, are preferably made of chemically inert materials. Some processes and system that may utilize or include a reagent trough may be particularly sensitive to chemical contaminants. For example, it has been found that DNA extraction or sequencing is impaired by certain metals or compounds leaching from system components into reagents. In some embodiments, the materials are free of plasticizers. In some embodiments, the materials are free of divalent cations.

The vessel of the reagent trough includes a bottom and one or more sidewalls. The horizontal profile of the vessel can be circular, oval, triangular, square, rectangular, or any other suitable shape. The vessels can optionally have curved corners. In some embodiments, the volume of the reagent trough is about 10 mL to about 5 liters (such as about 10 mL to about 20 mL, about 20 mL to about 50 mL, about 50 mL to about 100 mL, about 100 mL to about 250 mL, about 250 mL to about 500 mL to about 1 liter, about 1 liter to about 2 liters, or about 2 liters to about 5 liters). In some embodiments, the volume of the reagent trough is about 5 liters or less (such as about 2 liters or less, about 1 liter or less, about 500 mL or less, about 250 mL or less, or about 100 mL or less). In some embodiments, the vessel is made out of polytetrafluoroethylene (PTFE).

Figure 1B:
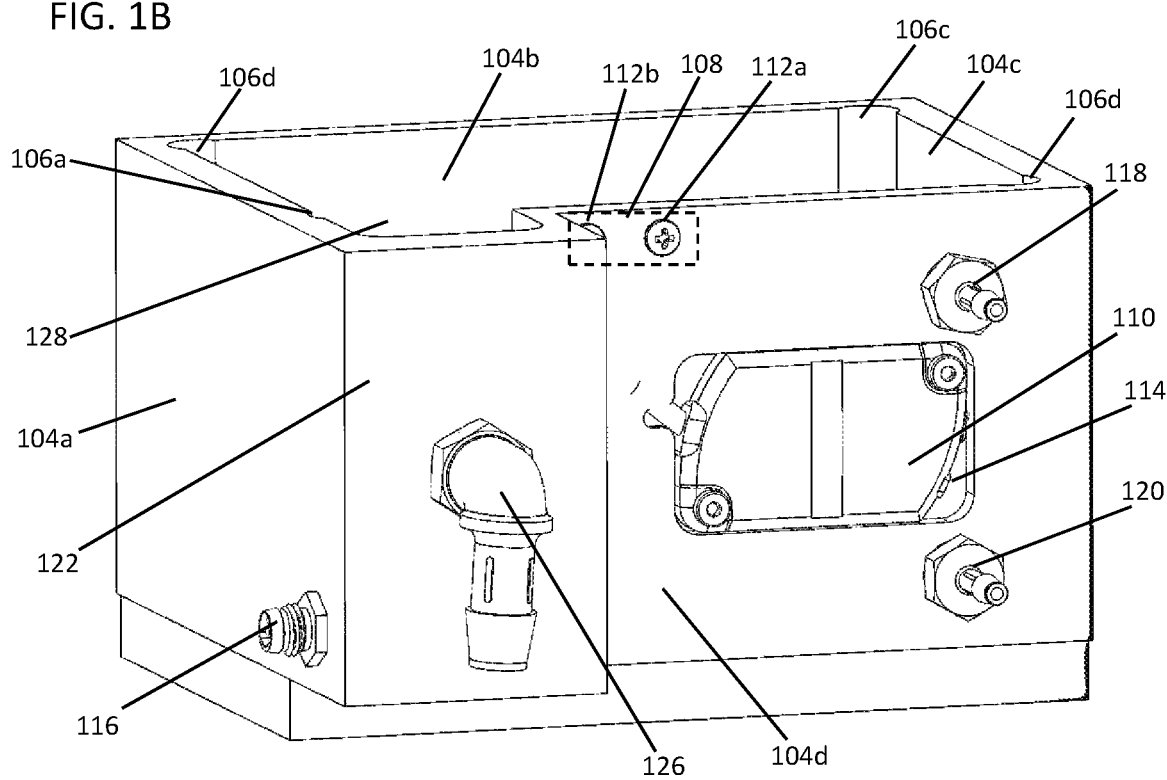
FIG. 1B illustrates a rotated view of the reagent trough illustrated in FIG. 1A.
Figure 2A:
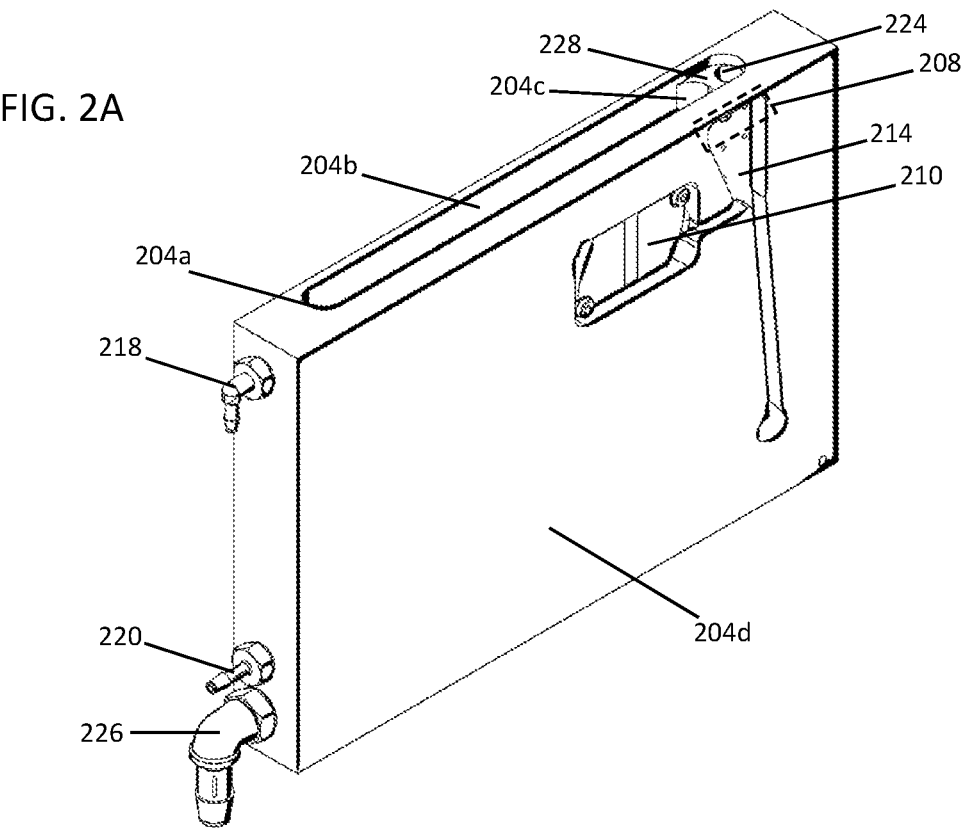
FIG. 2A illustrates another embodiment of a reagent trough.
Figure 2B:
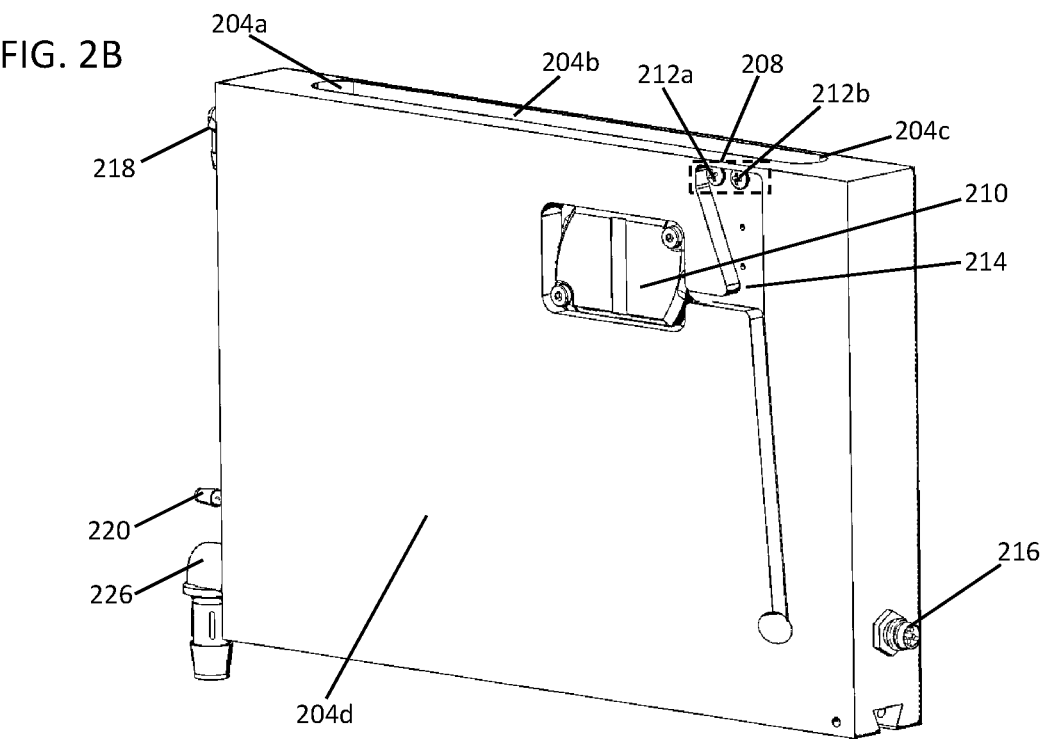
FIG. 2B illustrates rotated view of the reagent trough illustrated in FIG. 2A.

In some embodiments, the vessel has an open top. The open top can allow for a pipette system to dip one or more pipette tips into the liquid contained within the vessel and draw the liquid into the pipette tips. Some high-throughput systems include multi-channel pipette systems, which include one or more rows of pipette tips. For example, in some embodiments, a pipette system includes one or more rows (such as two or more, three or more, four or more, five or more, six or more, seven or more, or eight or more rows), wherein each row includes two or more pipette tips (such as three or more, four or more, five or more, six or more, seven or more, eight or more, nine or more, ten or more, eleven or more, or twelve or more) pipette tips. The length and width of the vessel can selected depending on the configuration (i.e., how many rows and how many pipette tips in each row) of the pipette system. In some embodiments, the vessel is wide enough to allow a plurality of rows of pipette tips to simultaneously dip into the liquid contained within the vessel, as shown in FIG. 1A and FIG. 1B. A narrow vessel can have a width, for example, of about 8 mm to about 30 mm (such as about 10 mm to about 15 mm, or about 12.5 mm). In some embodiments, the vessel is wide enough to only allow a single row of pipette tips to simultaneously dip into the liquid contained within the vessel, as shown in FIG. 2A and FIG. 2B. In some embodiments, the wide vessel has a width of about 50 mm to about 80 mm (such as about 60 mm to about 70 mm, or about 65 mm). In some embodiments, the vessel (which can be, for example, a wide width or a narrow width) has a length of about 60 mm to about 150 mm (such as about 60 mm to about 90 mm, or about 90 mm to about 150 mm).

In some embodiments, the liquid contained within the reagent trough is water, a buffer, or a sterilizing liquid. In some embodiments, the water is sterilized water, DNAse free water. RNAse free water, deionized water, or diethylpyrocarbonate (DEPC) treated water. In some embodiments, the buffer is a lysis buffer, a wash buffer, a binding buffer, or an elution buffer, for example as used during nucleic acid extraction or purification. In some embodiments, the liquid comprises alts, buffers (e.g., acetate, citrate, bis-tris, carbonate, CAPS. TAPS, bicine, tris, tricine, TAPSO, HEPES, TES, MOPS, PIPES, cacodylate, SSC, MES, succinic acid, or phosphates), amino acids, acids, bases, surfactants, detergents (e.g., SDS, triton X-100, or Tween-20), chaotropic agents (e.g., guanidinium thiocyanate), chelators (e.g., ethylenediaminetetraacetic acid, phosphonates, or citric acid), preservatives, antibiotics, alcohols (e.g., methanol, ethanol, propanol, or isopropanol), reducing compounds, oxidizing compounds, dyes, or biomolecules (e.g., nucleic acids, proteins, enzymes (e.g., RNAase or Proteinase K)). In some embodiments, the liquid comprises bleach.

As the liquid in the reagent trough is drawn out of the reagent trough and used by a sample processing system, the level of the liquid in the vessel decreases. A low-level liquid sensor can detect when the liquid level is below a predetermined threshold. When the liquid level is below the predetermined threshold, a liquid can be supplied to the vessel to raise the level of the liquid in the vessel, for example by an operably connected pump system that can supply the liquid to the reagent trough. The liquid can be supplied, for example through one of the liquid ports. In some embodiments, liquid is supplied to the vessel through the second liquid port (i.e., the liquid port positioned lower than the first liquid port). The high-level liquid sensor can detect when the liquid in the vessel is above a predetermined level. When the high-level liquid sensor detects the liquid above the predetermined level, liquid can be drained from the reagent through, for example by an operable connected pump system that can drain the liquid from the reagent trough. The liquid can be drained, for example, through one of the liquid ports. In some embodiments, the liquid is drained from the vessel through the first liquid port. This can prevent overflow of the liquid from the reagent trough.

In some embodiments, the high-level liquid sensor or the low-level liquid sensor is a capacitive sensor, a conductive sensor, an optical sensor, an acoustic sensor, or any other suitable sensor. The high-level liquid sensor and the low-level liquid sensor can be of the same type or of different types. For example, in some embodiments, the high-level liquid sensor is a capacitive sensor and the low-level liquid sensor is a conductive sensor. In some embodiments, the high-level liquid sensor or the low-level liquid sensor are positioned on the sidewall of the vessel. For example, the high-level liquid sensor or the low-level liquid sensor can contact the inner surface of the sidewall or the outer surface of the sidewall. In some embodiments, the high-level liquid sensor or the low-level liquid sensor does not contact the inner surface of the sidewall. In some embodiments, the high-level liquid sensor or the low-level liquid sensor is a conductive sensor that includes contacts on the inner surface of the sidewall. The contacts of the sensor are preferably made from a chemically resistant material, such as titanium. In some embodiments, the high-level liquid sensor or the low-level liquid sensor is a capacitive sensor that contacts the outer surface of the sidewall. In some embodiments, the high-level liquid sensor or the low-level liquid sensor are not positioned on the sidewall of the vessel. For example, in some embodiments, the high-level liquid sensor or the low level liquid sensor are positioned above the reagent trough and are configured to detect a liquid level in the reagent trough. Exemplary sensors that can be positioned above the reagent trough include an optical sensor or an acoustic sensor.

In some embodiments, the high-level liquid sensor generates a signal upon detecting the liquid. In some embodiments, the low-level liquid sensor generates a signal upon detecting the absence of the liquid. In some embodiments, the high-level liquid sensor or the low-level liquid sensor is connected to a computer system, for example via a data port present on the reagent trough. The high-level liquid sensor or the low-level liquid sensor can send a signal to the computer system, which can receive the signal. In some embodiments, the computer system is configured to operate a pump system in response to the signal generated by the high-level liquid sensor or the low-level liquid sensor.

The first liquid port is positioned on the vessel lower than the high-level liquid sensor. In some embodiments, the first reagent port is positioned on the sidewall of the vessel. In some embodiments, the first liquid port is suspended from above the reagent trough or rises from the bottom of the reagent trough. The first liquid port can be operably connected to a pump system, which can be used to drain liquid form the reagent trough or pump liquid into the reagent trough through the first liquid port. In some embodiments, the first liquid port is made out of polypropylene.

The second liquid port is position below the first liquid port. In some embodiments, the second liquid port is positioned blow the low-level liquid sensor. In some embodiments, the second liquid port is positioned on the sidewall of the vessel. In some embodiments, the second liquid port is suspended from above the reagent trough or rises from the bottom of the reagent trough. The second liquid port can be operably connected to a pump system, which can be used to drain liquid form the reagent trough or pump liquid into the reagent trough through the second liquid port. In some embodiments, the second liquid port is made out of polypropylene.

In some embodiments, the reagent trough includes an overflow drain. The overflow drain includes an inlet and an outlet. The inlet of the overflow drain is positioned below the top of the reagent trough sidewall, and is configured to receive liquid from within the reagent trough once the level of the liquid reaches the inlet. Liquid added to the reagent rough can then flow into the overflow drain through the inlet instead of spilling over the top of the reagent trough sidewall. The overflow drain thus minimizes spills of the liquid onto the laboratory workbench in the event of a system malfunction (e.g., an inoperable high-level liquid sensor or a clogged conduit or first liquid port). In some embodiments, the inlet of the overflow drain is perpendicular to the sidewall, which allows for a precise level of the liquid for efficient drainage. In some embodiments, the inlet of the overflow drain is positioned at the same height as the high-level liquid sensor. In some embodiments, the inlet of the overflow drain is positioned above the high-level liquid sensor. Liquid can then spill into the overflow drain, for example if the reagent trough was not drained upon the liquid level reaching the high-level liquid sensor (for example, if one or more liquid ports or conduits is clogged). Preferably, the inlet of the overflow drain is positioned above the first liquid port, which would allow the liquid to be drained through first liquid port and entering the inlet of the overflow valve only when the liquid is not sufficiently drained through the first liquid port. The outlet of the overflow drain is positioned below the inlet. In some embodiments, the outlet is operably connected (e.g., through a conduit) to a liquid reservoir or a waste management system.

FIG. 1A illustrates an exemplary embodiment of a reagent trough, with FIG. 1B illustrating a rotated view. In the illustrated embodiment, the vessel of the reagent trough includes a bottom 102 and four sidewalls (104a, 104b, 104c, and 104d). Although the illustrated embodiment includes four sidewalls, it is understood that a reagent trough can include one or more, two or more, three or more, or four or more sidewalls. Optionally, one or more of the corners (e.g., inner corners) of the sidewall (106a, 106b, 106c, and 106d) are rounded. The reagent trough includes a high-level liquid sensor 108 and a low-level liquid sensor 110. In the illustrated embodiment, the high-level liquid sensor 108 (indicated within the dashed box) is a conductive sensor that includes two contacts on the inner face of the sidewall 104d, which can be held in place using fasteners (such as screws or bolts) 112a and 112b. Liquid in the reagent trough at or above the level of the high-level liquid sensor bridges the contacts, indicating the presence of the liquid. In the illustrated embodiments, the low-level sensor 110 is a capacitive sensor. The sidewall 104d (e.g., outer surface of the sidewall) can include a recess 114, which provides a thinner portion of the sidewall 104d, which enhances the sensitivity of the capacitive sensor without compromising the durability of the reagent trough. In some embodiments, the low-level sensor is disposed within the recess 114 and on the outer surface of the sidewall 104d. Although in the illustrated embodiment the high-level liquid sensor 108 and the low-level liquid sensor 110 are disposed on the same sidewall 104d, it is understood that the high-level liquid sensor 108 and the low-level liquid sensor 110 can be disposed on the same sidewall or on different sidewalls. The high-level liquid sensor 108 and the low-level liquid sensor 110 are operably connected to a data port 116. The data port 116 can be operably connected to a computer system, which can receive a signal from the high-level liquid sensor 108 and the low-level sensor 110.

The reagent trough illustrated in FIG. 1A and FIG. 1B includes a first liquid port 118 and a second liquid port 120. The first liquid port 118 is positioned on the sidewall 104*d* of the vessel and lower than the high-level liquid sensor 108. The second liquid port 120 is positioned on the sidewall 104*d* of the vessel and lower than the low-level liquid sensor 110. Both the first liquid port 118 and the second liquid port 120 traverse the sidewall 104*d*, fluidly connecting the inside of the vessel to the outside of the vessel. The first liquid port 118 and the second liquid port 120 can be fluidly connected to a pump system, which can pump liquid into the reagent trough or drain liquid out of the reagent trough through the first liquid port 118 or the second liquid port 120.

The reagent trough illustrated in FIG. 1A and FIG. 1B also includes on overflow drain 122, which comprises an inlet 124 and an outlet 126. Although the embodiment illustrated in FIG. 1A and FIG. 1B includes the overflow drain 122, it is understood that some embodiments of the reagent trough do not include the overflow drain 122. Sidewall 104*d* includes a cutout 128 aligned with the inlet 124 of the overflow drain 122. Liquid in the vessel of the reagent trough can flow through the cutout 128 and into the inlet 124 of the overflow drain 122 without flowing over the sidewalls 104*a*, 104*b*. 104*c*, and 104*d*. The inlet 124 illustrated in FIG. 1A is vertically disposed, which allows efficient drainage of the liquid flowing into the inlet. The inlet 124 is also positioned above the first liquid port 118. The outlet 126 of the overflow drain 122 is positioned lower than the inlet 124. Positioning the outlet 126 lower than the inlet 124, liquid can flow through the overflow drain 122 by gravity force. Nevertheless, it is contemplated that a vacuum force can be applied to the outlet 126 to pull liquid through the overflow drain 122. In some embodiments, the outlet 126 of the overflow drain 122 is fluidly connected by a conduit to a waste management system or a liquid reservoir.

FIG. 2A illustrates another exemplary embodiment of a reagent trough, with FIG. 2B illustrating a rotated view. In the illustrated embodiment, the vessel of the reagent trough includes a bottom (not visible) and four sidewalls (204*a*, 204*b*, 204*c*, and 204*d*). Sidewalls 204*a* and 204*d* are rounded and shorter sidewalls 204*b* and 204*d*. The elongated sidewalls 204*b* and 204*d* provide an elongated vessel shape. The reagent trough includes a high-level liquid sensor 208 and a low-level liquid sensor 210. In the illustrated embodiment, the high-level liquid sensor 208 (indicated within the dashed box) is a conductive sensor that includes two contacts on the inner face of the sidewall 204*d*, which can be held in place using fasteners (such as screws or bolts) 212*a* and 212*b*. Liquid in the reagent trough at or above the level of the high-level liquid sensor bridges the contacts, indicating the presence of the liquid. The low-level liquid sensor 210 is a capacitive sensor. The sidewall 204*d* can include a recess 214, which provides a thinner portion of the sidewall 204*d*. The low-level liquid sensor is disposed within the recess 214 and on the outer surface of the sidewall 204*d*. The fasteners 212*a* and 212*b* of the high-level liquid sensor 208 can also be disposed within the recess 214. The high-level liquid sensor 208 and the low-level sensor 210 can be operatively connected to a data port 216, for example by wires that are at least partially disposed in a channel of the recess 214. The data port 216 can be operably connected to a computer system, which can receive a signal from the high-level liquid sensor 208 and the low-level sensor 210. Although in the illustrated embodiment the high-level liquid sensor 208 and the low-level liquid sensor 210 are disposed on the same sidewall 204*d*, it is understood that the high-level liquid sensor 208 and the low-level liquid sensor 210 can be disposed on the same sidewall or on different sidewalls.

The reagent trough illustrated in FIG. 2A and FIG. 2B include a first liquid port 218 and a second liquid port 220. The first liquid port 218 is positioned on the sidewall 204*d* of the vessel and lower than the high-level liquid sensor 208. The second liquid port 220 is positioned on the sidewall 204*a* of the vessel and lower than the low-level liquid sensor 210. Both the first liquid port 218 and the second liquid port 220 transverse the sidewall 204*a*, fluidly connecting the inside of the vessel to the outside of the vessel. The first liquid port 218 and the second liquid port 220 can be fluidly connected to a pump system, which can pump liquid into the reagent trough or drain liquid out of the reagent trough through the first liquid port 218 or the second liquid port 220.

The reagent trough illustrated in FIG. 2A and FIG. 2B also includes on overflow drain, which comprises an inlet 224 and an outlet 226. The overflow drain includes a channel that connects to the inlet 224 to the outlet 226. The channel passes through the sidewall 204*c* and the bottom of the vessel, thereby reaching the outlet 226 on the opposite sidewall 204*a*. Although the embodiment illustrated in FIG. 2A and FIG. 2B includes the overflow drain, it is understood that some embodiments of the reagent trough do not include the overflow drain. Sidewall 204*c* includes a cutout 228 aligned with the inlet 224 of the overflow drain. Liquid in the vessel of the reagent trough can flow through the cutout 228 and into the inlet 224 without flowing over the sidewalls 204*a*, 204*b*, 204*c*, and 204*d*. The inlet 224 illustrated in FIG. 2A is vertically disposed, which allows efficient drainage of the liquid flowing into the inlet. The inlet 224 is also positioned above the first liquid port 218. The outlet 226 of the overflow drain is positioned lower than the inlet 224. Positioning the outlet 226 lower than the inlet 224, fluid can flow through the overflow drain 222 by gravity force. Nevertheless, it is contemplated that a suction (i.e., vacuum) force can be applied to the outlet 226 to pull liquid through the overflow drain. In some embodiments, the outlet 226 of the overflow drain is fluidly connected by a conduit to a waste management system or a liquid reservoir.

Liquid in the reagent trough can be recirculated. In some embodiments, liquid flows into the vessel via the second liquid port (that is, the lower liquid port) and out of the vessel via the first liquid port (that is, the higher liquid port). When liquid is drained from (i.e., flows out of) the reagent trough via the first liquid port, the position of the first liquid port sets the desired maximum level of the liquid. If the liquid level raises above the first liquid port (for example due to ineffective drainage from the first liquid port, which may be caused by, for example, by a clogged conduit or a failed pump system, or by a high rate or liquid flowing into the vessel), it can drain through the overflow drain once reaching the level of the overflow drain inlet. The liquid may also rise to the high-level liquid sensor, which can trigger a signal indicating the high level of the liquid. In some embodiments, when the level of the liquid in the vessel is at the level of the first liquid port, the first liquid port can draw both the liquid and air bubbles. Bubbles can be monitored by a bubble sensor, which indicates that the liquid is at the level of the first liquid port. While liquid is being drained from the reagent trough via the first liquid port, liquid can be added to the reagent trough via the second liquid port. In some embodiments, recirculation of the liquid in the reagent trough occurs for a predetermined amount of time, which can be triggered automatically or manually. For example, in some embodiments, recirculation of the liquid in the reagent trough occurs for about 10 seconds to about 2 minutes (such as about 10 seconds to about 30 seconds, about 30 seconds to about 60 seconds, or about 60 seconds to about 2 minutes). In some embodiments, recirculation of the liquid in the reagent trough is triggered automatically for a predetermined periodicity. For example, in some embodiments, recirculation of the liquid in the reagent is triggered every 30 seconds or more, every 60 seconds or more, every 2 minutes or more, every 3 minutes or more, every 5 minutes or more, or every 10 minutes or more). In some embodiments, the liquid is recirculated in the vessel at a rate of about 80 mL/min to about 300 ml/min (such as about 80 mL/min to about 120 mL/min, about 120 mL/min to about 150 mL/min, about 150 mL/min to about 200 mL/min, or about 200 mL/min to about 300 mL/min).

In some embodiments, the low-level liquid sensor is tested. It is useful to occasionally test the low-level liquid sensor to ensure that it is properly functioning. To test the low-level liquid sensor, liquid can be drained from the reagent trough via the second liquid port (that is, the lower liquid port), wherein the second liquid port is positioned below the low-level liquid sensor. Preferably, no liquid is added to the reagent trough while testing the low-level liquid sensor. Once the level of the liquid is lower than the low-level liquid sensor, the low-level liquid sensor can trigger a signal indicating that the level of the liquid is below the low-level liquid sensor. The signal also indicates that the low-level liquid sensor is functioning. In some embodiments, the signal is transmitted to a computer system, which can record proper functioning of the low-level liquid sensor. The low-level liquid sensor can be tested manually (for example, by a user initiating the test) or automatically. In some embodiments, the low-level liquid sensor is tested at a predetermined periodicity, for example every 6 hours or more, every 12 hours or more, every 24 hours or more, every 2 days or more, every 7 days or more, every 14 days or more, or every month or more.

In some embodiments, the high-level liquid sensor is tested. It is useful to occasionally test the high-level liquid sensor to ensure that it is properly functioning. To test the high-level liquid sensor, liquid can be added to the reagent trough via the second liquid port (that is, the lower liquid port) or the first liquid port (that is, the higher liquid port). Preferably, no liquid is drained from the reagent trough while testing the high-level liquid sensor. Once the level of the liquid is higher than the high-level liquid sensor, the high-level liquid sensor can trigger a signal indicating that the level of the liquid is above the high-level liquid sensor. The signal also indicates that the high-level liquid sensor is functioning. In some embodiments, the signal is transmitted to a computer system, which can record proper functioning of the high-level liquid sensor. The high-level liquid sensor can be tested manually (for example, by a user initiating the test) or automatically. In some embodiments, the high-level liquid sensor is tested at predetermined periodicity, for example every 6 hours or more, every 12 hours or more, every 24 hours or more, every 2 days or more, every 7 days or more, every 14 days or more, or every month or more.

In some embodiments, a reagent trough comprises a vessel comprising a bottom and a sidewall; a high-level liquid; a low-level liquid sensor positioned to detect liquid at a lower level than the high-level liquid sensor, a first liquid port positioned lower than the high-level liquid sensor; and a second liquid port positioned lower than the first liquid port. In some embodiments, the high-level liquid sensor and the low-level liquid sensor are connected to a data port. In some embodiments, the high-level liquid sensor is a conductive sensor or a capacitive sensor. In some embodiments, the low-level liquid sensor is a conductive sensor or a capacitive sensor. In some embodiments, the first liquid port and the second liquid port are fluidly connected to a pump system. In some embodiments, the high-level liquid sensor or the low-level liquid sensor is an optical sensor or an acoustic sensor.

In some embodiments, a reagent trough comprises a vessel comprising a bottom and a sidewall; a high-level liquid sensor on the sidewall; a low-level liquid sensor on the sidewall positioned lower than the high-level liquid sensor, a first liquid port positioned lower than the high-level liquid sensor, and a second liquid port positioned lower than the first liquid port. In some embodiments, the high-level liquid sensor and the low-level liquid sensor are connected to a data port. In some embodiments, the high-level liquid sensor is a conductive sensor or a capacitive sensor. In some embodiments, the low-level liquid sensor is a conductive sensor or a capacitive sensor. In some embodiments, the first liquid port and the second liquid port are fluidly connected to a pump system.

In some embodiments, a reagent trough comprises a vessel comprising a bottom and a sidewall; a high-level liquid sensor on the sidewall; a low-level liquid sensor on the sidewall positioned lower than the high-level liquid sensor; a first liquid port positioned lower than the high-level liquid sensor; and a second liquid port positioned lower than the first liquid port and the low-level liquid sensor. In some embodiments, the high-level liquid sensor and the low-level liquid sensor are connected to a data port. In some embodiments, the high-level liquid sensor is a conductive sensor or a capacitive sensor. In some embodiments, the low-level liquid sensor is a conductive sensor or a capacitive sensor. In some embodiments, the first liquid port and the second liquid port are fluidly connected to a pump system.

In some embodiments, a reagent trough comprises a vessel comprising a bottom and a sidewall; a high-level liquid sensor on the sidewall; a low-level liquid sensor on the sidewall positioned lower than the high-level liquid sensor, a first liquid port positioned on the sidewall and lower than the high-level liquid sensor, and a second liquid port positioned on the sidewall and lower than the first liquid port and the low-level liquid sensor. In some embodiments, the high-level liquid sensor and the low-level liquid sensor are connected to a data port. In some embodiments, the high-level liquid sensor is a conductive sensor or a capacitive sensor. In some embodiments, the low-level liquid sensor is a conductive sensor or a capacitive sensor. In some embodiments, the first liquid port and the second liquid port are fluidly connected to a pump system.

In some embodiments, a reagent trough comprises a vessel comprising a bottom and a sidewall; a high-level liquid sensor on the sidewall; a low-level liquid sensor on the sidewall positioned lower than the high-level liquid sensor; a first liquid port positioned on the sidewall and lower than the high-level liquid sensor a second liquid port positioned on the sidewall and lower than the first liquid port and the low-level liquid sensor, and an overflow drain comprising an inlet and an outlet, the inlet positioned above the first liquid port. In some embodiments, the inlet is perpendicular to the sidewall. In some embodiments, the outlet of the overflow drain is fluidly connected to a waste management system. In some embodiments, the high-level liquid sensor and the low-level liquid sensor are connected to a data port. In some embodiments, the high-level liquid sensor is a conductive sensor or a capacitive sensor. In some embodiments, the low-level liquid sensor is a conductive sensor or a capacitive sensor. In some embodiments, the first liquid port and the second liquid port are fluidly connected to a pump system.

Pump Systems

In some embodiments, a pump system comprises a first liquid reservoir port connected to a first pump by a first conduit, a first junction connected to the first pump by a second conduit, a first liquid supply port connected to the first junction by a third conduit, a second liquid supply port connected to a second junction by a fourth conduit, a control valve connecting the first junction and the second junction, a second pump connected to the second junction by a fifth conduit, and a second liquid reservoir port connected to the second pump by a sixth conduit. This configuration of the pump system can allow for controlled liquid flow through the first liquid supply port or the second liquid supply port by operating the first pump, the second pump and the control valve.

Components of the pump system, particularly components that contact the liquid, are preferably made of chemically inert materials. Some processes and system that may utilize or include the pump system may be particularly sensitive to chemical contaminants. For example, it has been found that DNA extraction or sequencing is impaired by certain metals or compounds leaching from system components into reagents. In some embodiments, the materials are free of plasticizers. In some embodiments, the materials are free of divalent cations. In some embodiments, one or more of the conduits comprise a placiticizer-free material or a diethylhexyl phthalate (DEHP) free material, such as Tygon® 2375 or Tygon® 2075. In some embodiments, one or more of the junctions, reservoir ports, or supply ports comprise polypropylene. In some embodiments, the control valve comprises polyeherimide (PEI) (for example, in the block of the control valve) and/or ethylene propylene diene monomer (M-class) rubber (EDPM) (for example in the control valve seal). In some embodiments, one or both of the pumps comprise polyvinylidee fluoride (PVDF) (such as Kynar® PVDF) (for example, in the diaphragm of the pump), perfluoroelastomer (FFKM) (such as Kalrez@) (for example, in the pump gasket), or polytetrafluoroethylene (PTFE) (for example, in the block of the pump).

The control valve can be any valve operable to control the flow of liquid between the first junction and the second junction. In some embodiments, the control valve is a stop flow valve, which prevents the liquid from flowing between the first junction and the second junction in the closed (i.e., "stop") position and allows the liquid to flow between the first junction and the second junction in the open (i.e., "flow") position. In some embodiments, the control valve is a solenoid valve.

Optionally, a one-way valve (i.e., a check valve) is disposed along the second conduit, which is configured to allow liquid to flow from the first pump to the first junction but prevent liquid from flowing from the first junction to the first pump. The one-way valve can be included in the pump system to prevent back-flow into the first pump.

In some embodiments, the pump system includes a data port. The data port can be connected a computer system, which can operate the pump system. In some embodiments, the data port is connected to the control valve, which can be operably controlled by the computer system via the data port. For example, the computer system can alter the control valve to control flow between the first junction and the second junction, for example by positioning the control valve in a closed position or an open position. In some embodiments, the data port is connected to the first pump or the second pump. The computer system can operably control the first pump or the second pump, for example by controlling flow rates of the first pump or the second pump or by turning the first pump or the second pump on or off.

In some embodiments, the pump system comprises a bubble sensor, which can be connected to the data port (and the computer system by way of the data port). The bubble sensor can be comparable to detect bubbles in one or more of the conduits. For example, in some embodiments, the bubble sensor is operable to detect bubbles the fourth conduit, the fifth conduit, or the sixth conduit. As described in further detail herein, the pump system can be fluidly connected to a reagent trough, and bubbles can form when liquid is drained from the reagent trough via the first liquid port of the reagent trough and the liquid level in the vessel of the reagent trough is at or about at the level of the first liquid port. The bubble sensor can thereby transmit a signal to the computer system, which indicates that the liquid level is at or about at the level of the first liquid port of the reagent trough.

Figure 3:
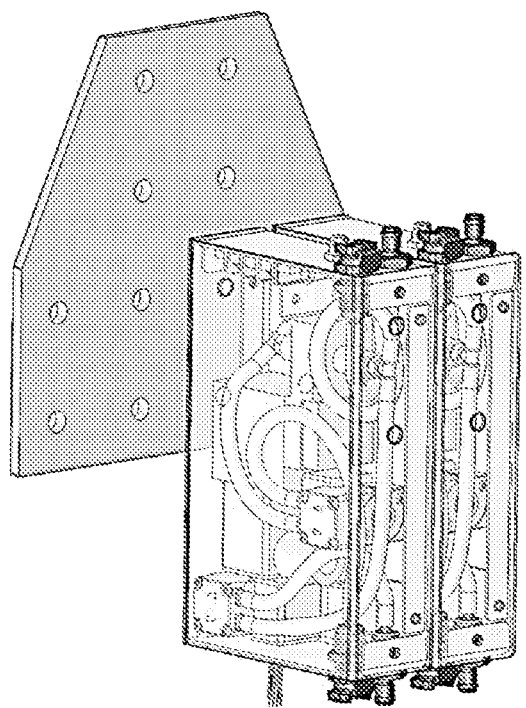
FIG. 3 illustrates two pump systems that are vertically mounted on a surface.

In some embodiments, the pump system is contained within a housing. The housing can include one or more mounts, which can be used to mount the pump system to a surface. In some embodiments, the pump system is vertically mounted (that is, the longest dimension) of the pump system is in a vertical plane). In some embodiments, a plurality of pump systems can be mounted adjacent to one another. Adjacent mounting of a plurality of pump systems allows for multiple pump systems to be integrated into a high-throughput sample processing system (which may include a plurality of reagent delivery systems) in a confined space. FIG. 3 illustrates two pump systems that are vertically mounted on a surface. Optionally, a spill sensor in included within the housing, which can detect leaks in the pump system. In some embodiments, the spill sensor is connected to the data port, which is connected to the computer system. The spill sensor can detect a spill and signal the computer system.

Figure 4:
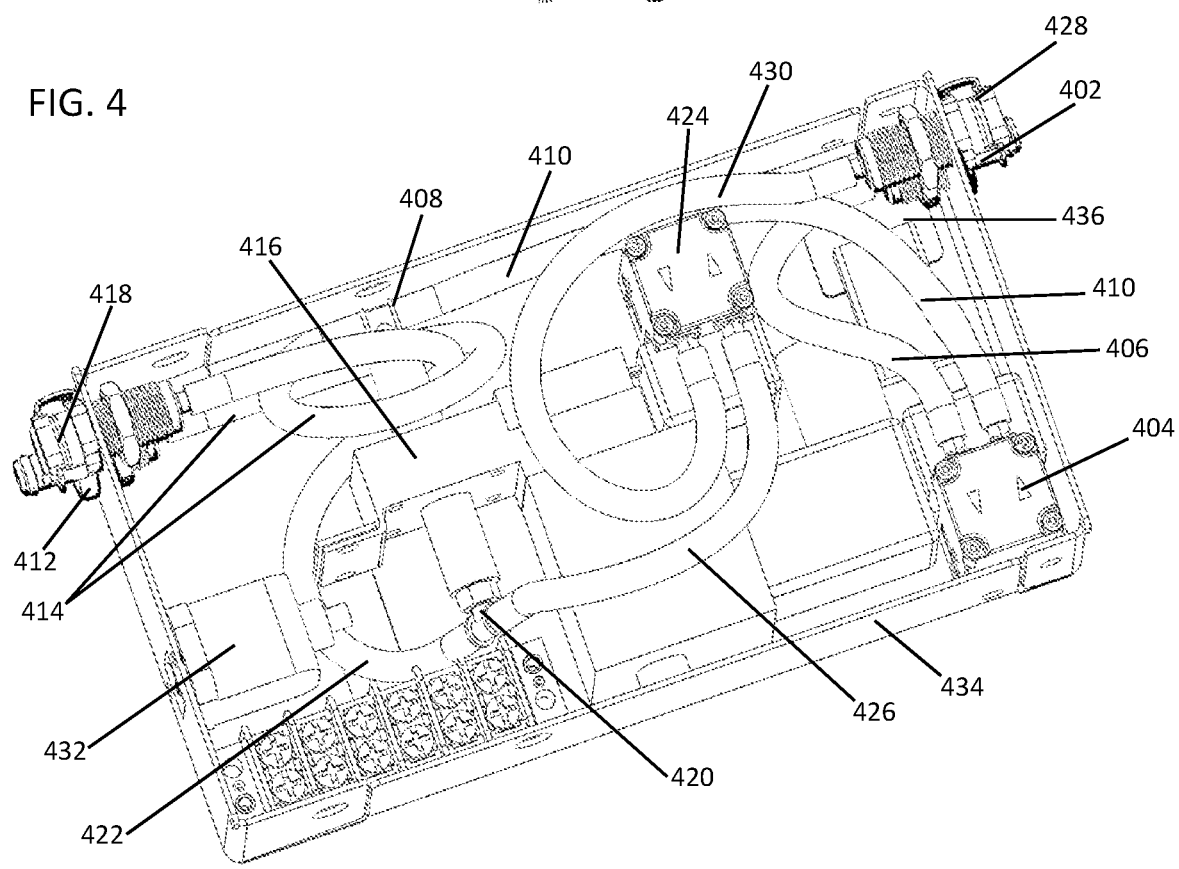
FIG. 4 illustrates one embodiment of a pump system.

FIG. 4 illustrates one embodiment of a pump system. The pump system includes a first reservoir port 402 connected to a first pump 404 by a first conduit 406. The first reservoir port 402 can be connected to a liquid reservoir, which stores the liquid. A first junction 408 is connected to the first pump 404 by a second conduit 410. The first junction 408 is connected to a first liquid supply port 412 by a third conduit 414, and to a control valve (such as a stop flow valve) 416. The pump system further includes a second liquid supply port 418 connected to a second junction 420 by a fourth conduit 422. The first liquid supply port 412 and the second liquid supply port 418 can be fluidly connected to a reagent trough (such as the first liquid port and the second liquid port of the reagent trough) in a reagent delivery system. The second junction 420 connects to the control valve 416. The second junction 420 is also connects to a second pump 424 by a fifth conduit 423 426. The second pump 424 is connected to a second liquid reservoir port 428 by a sixth conduit 430. The pump system further includes a data port 432, which is connected to the control valve 416, the first pump 404, and the second pump 424. The pump system is contained within a housing 434. A spill sensor 436 is also contained within the housing 434, and is connected to the data port 432.

The pump system can be operated by a computer system, which can operate the control valve, the first pump, and the second pump. In some embodiments, the pump system is operable in a recirculation mode, a fill mode, or an empty mode.

When the pump system is operated in a recirculation mode, both the first pump and the second pump are active and the control valve is in a closed position. The first pump draws liquid into the pump system via the first reservoir port, and then through the first conduit, the first pump, the second conduit, the first junction, the third conduit, and out through the first liquid supply port. Because the control valve is closed, the liquid does not pass through the control valve. In some embodiments, the first liquid supply port is fluidly connected to a reagent trough, and the liquid can flow into the vessel of the reagent trough, for example via the second liquid port of the reagent trough. During the recirculation mode, the second pump is also active. The second pump can pull liquid into the pump system via the second liquid supply port (which can be fluidly connected to the reagent trough, for example at the first liquid port of the reagent trough), through the fourth conduit, the second junction, the fifth conduit, the second pump, the sixth conduit, and out of the pump system via the second reservoir port. In this manner, the liquid, which can be held in a liquid reservoir fluidly connected to the first reservoir port and the second reservoir port, can be circulated to a reagent trough and back into the liquid reservoir. In some embodiments the first pump is operated at a slower rate than the second pump. For example, in some embodiments, the first pump is operated at about 90% or less (such as about 80% or less, about 70% or less, about 60% or less, about 50% or less, about 40% or less, about 30% or less, or about 20% or less) of the rate of the second pump.

When the pump system is operated in the fill mode, the first pump is active, the second pump is inactive, and the control valve is in a closed position. The first pump draws liquid into the pump system via the first reservoir port, and then through the first conduit, the first pump, the second conduit, the first junction, the third conduit, and out through the first liquid supply port. Because the control valve is closed, the liquid does not pass through the control valve. The first liquid supply port can be fluidly connected to a reagent trough (for example via the second liquid port of the reagent trough), and the liquid flows into the reagent trough when the pump system is operated in the fill mode. Because the second pump is inactive, the pump system does not pull liquid through the second liquid supply port or pump liquid into the reservoir.

When the pump system is operated in the empty mode, the first pump is inactive, the second pump is active, and the control valve is in an open position. The second pump draws liquid into the pump system via the first liquid supply port, which can be fluidly connected to a reagent trough (for example, via the second liquid port of the reagent trough), through the first junction, the control valve (which is now in the open position), the fifth conduit, the second pump, the six conduit, and through the second reservoir port. Liquid can also be pulled through the second liquid supply port, fourth conduit, and into the second junction where it joins the liquid pulled through the first liquid supply port if liquid is available at the second liquid supply port (for example, if the second liquid supply port is fluidly connected to the first liquid port of the reagent trough and the level of the liquid in the reagent trough is at or above the level of the first liquid port of the reagent trough).

In some embodiments, a pump system comprises a first liquid reservoir port connected to a first pump by a first conduit; a first junction connected to the first pump by a second conduit; a first liquid supply port connected to the first junction by a third conduit; a second liquid supply port connected to a second junction by a fourth conduit a control valve connecting the first junction and the second junction; a second pump connected to the second junction by a fifth conduit; and a second liquid reservoir port connected to the second pump by a sixth conduit. In some embodiments, the pump system is contained within a housing. In some embodiments, the pump system further comprises a spill sensor (which is optionally connected to a data port) disposed within the housing. In some embodiments, the data port is connected to a computer system operable to control the control valve, the first pump, or the second pump.

In some embodiments, a pump system comprises a first liquid reservoir port connected to a first pump by a first conduit; a first junction connected to the first pump by a second conduit; a first liquid supply port connected to the first junction by a third conduit; a second liquid supply port connected to a second junction by a fourth conduit; a stop-flow valve connecting the first junction and the second junction; a second pump connected to the second junction by a fifth conduit; and a second liquid reservoir port connected to the second pump by a sixth conduit. In some embodiments, the pump system is contained within a housing. In some embodiments, the pump system further comprises a spill sensor (which is optionally connected to a data port) disposed within the housing. In some embodiments, the data port is connected to a computer system operable to control the stop-flow valve, the first pump, or the second pump.

In some embodiments, a pump system comprises a first liquid reservoir port connected to a first pump by a first conduit; a first junction connected to the first pump by a second conduit; a one-way valve disposed along the second conduit; a first liquid supply port connected to the first junction by a third conduit; a second liquid supply port connected to a second junction by a fourth conduit; a stop-flow valve connecting the first junction and the second junction; a second pump connected to the second junction by a fifth conduit; and a second liquid reservoir port connected to the second pump by a sixth conduit. In some embodiments, the pump system is contained within a housing. In some embodiments, the pump system further comprises a spill sensor (which is optionally connected to a data port) disposed within the housing. In some embodiments, the data port is connected to a computer system operable to control the stop-flow valve, the first pump, or the second pump.

In some embodiments, a pump system comprises a first liquid reservoir port connected to a first pump by a first conduit; a first junction connected to the first pump by a second conduit; a one-way valve disposed along the second conduit; a first liquid supply port connected to the first junction by a third conduit; a second liquid supply port connected to a second junction by a fourth conduit; a stop-flow valve connecting the first junction and the second junction; a second pump connected to the second junction by a fifth conduit; a second liquid reservoir port connected to the second pump by a sixth conduit; and a data port connected to the stop-flow valve, the first pump, and the second pump. In some embodiments, the pump system is contained within a housing. In some embodiments, the pump system further comprises a spill sensor (which is optionally connected to a data port) disposed within the housing. In some embodiments, the data port is connected to a computer system operable to control the stop-flow valve, the first pump, or the second pump.

In some embodiments, a pump system comprises a first liquid reservoir port connected to a first pump by a first conduit; a first junction connected to the first pump by a second conduit; a one-way valve disposed along the second conduit; a first liquid supply port connected to the first junction by a third conduit; a second liquid supply port connected to a second junction by a fourth conduit; a stop-flow valve connecting the first junction and the second junction; a second pump connected to the second junction by a fifth conduit; a second liquid reservoir port connected to the second pump by a sixth conduit; a bubble sensor operable to detect bubbles in one or more of the conduits (such as the fourth conduit, the fifth conduit, or the sixth conduit); and a data port connected to the stop-flow valve, the first pump, the second pump, and the bubble sensor. In some embodiments, the pump system is contained within a housing. In some embodiments, the pump system further comprises a spill sensor (which is optionally connected to a data port) disposed within the housing. In some embodiments, the data port is connected to a computer system operable to control the stop-flow valve, the first pump, or the second pump.

Reagent Delivery Systems

A reagent delivery system includes a pump system, a liquid reservoir, and a reagent trough. The pump system is fluidly connected to the reagent trough and the liquid reservoir, and can pump liquid from the liquid reservoir into the reagent trough. In some embodiments, a reagent delivery system comprises a pump system comprising a first liquid reservoir port connected to a first pump by a first conduit, a first junction connected to the first pump by a second conduit, a first liquid supply port connected to the first junction by a third conduit, a second liquid supply port connected to a second junction by a fourth conduit, a control valve connecting the first junction and the second junction, a second pump connected to the second junction by a fifth conduit, and a second liquid reservoir port connected to the second pump by a sixth conduit; a liquid reservoir fluidly connected to the first liquid reservoir port and the second liquid reservoir port; and a reagent trough fluidly connected to the first liquid supply port and the second liquid supply port. In some embodiments, the reagent trough comprises a vessel comprising a bottom and a sidewall; a high-level liquid sensor on the sidewall; a low-level liquid sensor on the sidewall positioned lower than the high-level liquid sensor, a first liquid port positioned lower than the high-level liquid sensor, wherein the first liquid port is fluidly connected to the second liquid supply port of the pump system; and a second liquid port positioned lower than the first liquid port, wherein the second liquid port is fluidly connected to the first liquid supply port of the pump system. The pump system or the reagent trough can further include any of the features described herein.

The liquid reservoir can be any suitable vessel that contains the liquid. In some embodiments, the liquid contained within the liquid reservoir is water, a buffer, or a sterilizing liquid. In some embodiments, the water is sterilized water, DNAse free water, RNAse free water, deionized water, or diethylppyrocarbonate (DEFC) treated water. In some embodiments, the buffer is a lysis buffer, a wash buffer, a binding buffer, or an elution buffer, for example as used during nucleic acid extraction or purification. In some embodiments, the liquid comprises alts, buffers (e.g., acetate, citrate, bis-tris, carbonate, CAPS, TAPS, bicine, tris, tricine, TAPSO, HEPES, TES, MOPS. PIPES, cacodylate, SSC, MES, succinic acid, or phosphates), amino acids, acids, bases, surfactants, detergents (e.g., SDS, triton X-100, or Tween-20), chaotropic agents, chelators (e.g., ethylenediaminetetraacetic acid, phosphonates, or citric acid), preservatives, antibiotics, alcohols (e.g., methanol, ethanol, propanol, or isopropanol), reducing compounds, oxidizing compounds, dyes, or biomolecules (e.g., nucleic acids, proteins, enzymes (e.g., RNAase or Proteinase K)). In some embodiments, the liquid comprises bleach. In some embodiments, the liquid reservoir has a volume capacity of about 1 liter or more (such as about 2 liters or more, about 5 liters or more, about 10 liters or more, about 25 liters or more, about 50 liters or more, or about 100 liters or more). The liquid reservoir includes two conduits within the reservoir, wherein the first conduit is fluidly connected to the first reservoir port and the second conduit is fluidly connected to the second reservoir port. The pump system can pump liquid out of the liquid reservoir through the first conduit, and can liquid back to the liquid reservoir through the second conduit. In some embodiments, the liquid reservoir is not disposed on a laboratory workbench and the reagent trough is disposed on a laboratory workbench. Since the reagent trough and the liquid reservoir contain the same liquid, the reagent delivery system allows access to the nearly the full volume of the liquid reservoir (that is, minus whatever residual amount is present in the pump system or conduits) on the laboratory workbench without the need for the larger liquid reservoir to be present on the laboratory workbench.

In some embodiments, the liquid delivery system is operated by a computer system. The computing system may include, for example, a microprocessor, memory, storage, and one or more input/output devices (e.g., monitor, keyboard, disk drive, Internet connection, etc.). The I/O device can be connected to a display, a keyboard, a disk storage unit, and a media drive unit. The media drive unit can read/write a computer-readable medium, which can contain programs and/or data. At least some values based on the results of the processes described herein can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal. C. C++, Java. Python. JSON, etc.) or some specialized application-specific language.

The computer system I/O device can also be connected to the data port of the reagent trough or the data port of the pump system. The reagent trough can include a high-level liquid sensor and a low-level liquid sensor connected to the data port of the reagent trough. Accordingly, the high-level liquid sensor or the low-level liquid sensor can be configured to transmit a signal to the computer system. The pump system includes a first pump, a second pump, and a control valve, which can be connected to the computer system via the data port on the pump system. The computer system can operate the first pump, the second pump, and the control valve. For example, in some embodiments, the computer system operates the pump system (and, accordingly, the first pump, second pump and the control valve) in a recirculation mode, a fill mode, or an empty mode. In some embodiments, the computer system operates the pump system in response to one or more signals generated by the high-level liquid sensor or the low-level liquid sensor on the reagent trough. In some embodiments, the pump system further comprises a bubble sensor, which can be connected to the computer system via the data port on the pump system. In some embodiments, the pump system further comprises a spill sensor, which can be connected to the computer system via the data port on the pump system.

In some embodiments, the computer system operates the reagent delivery system in a recirculation mode. When the reagent delivery system is operated in a recirculation mode, both the first pump and the second pump are activated and the control valve is in a closed position. The first pump draws liquid into the pump system from the liquid reservoir. Liquid flows from the liquid reservoir and through the first reservoir port of the pump system. Once in the pump system, the liquid flows through the first conduit, the first pump, the second conduit, the first junction, the third conduit, and out of the pump system through the first liquid supply port. Because the control valve is closed, the liquid does not pass through the control valve. The first liquid supply port is fluidly connected to the second liquid port of the reagent trough, and the liquid flows into the vessel of the reagent trough via the second liquid port of the reagent trough. During the recirculation mode, the second pump is also active. In some embodiments the first pump is operated at a slower rate than the second pump. For example, in some embodiments, the first pump is operated at about 90% or less (such as about 80% or less, about 70% or less, about 60% or less, about 50% or less, about 40% or less, about 30% or less, or about 20% or less) of the rate of the second pump. If the liquid in the reagent trough is at or above the level of the first liquid port of the reagent through, the second pump pulls liquid from the reagent trough into the pump system via the second liquid supply port. The liquid can then flow through the fourth conduit, the second junction, the fifth conduit, the second pump, the sixth conduit, and out of the pump system via the second reservoir port. The second reservoir port is fluidly connected to the liquid reservoir, and the liquid flows back into the liquid reservoir. If the level of the liquid is below the level of the first liquid port of the reagent trough, the liquid will not be recirculated back into the pump system or the liquid reservoir. Instead, the liquid added to the reagent trough by the first pump will raise the level of the liquid in the reagent trough. Operating the reagent delivery system in recirculation mode can thereby refresh the liquid in the reagent tough after it has been withdrawn, for example by a pipette system.

In some embodiments, the reagent delivery system is operated in recirculation mode for a predetermined amount of time. In some embodiments, the recirculation mode is triggered automatically, for example by the computer system. In some embodiments, the recirculation mode is triggered manually, for example by a user providing instruction to the computer system to operate the reagent delivery system in recirculation mode. In some embodiments, the reagent delivery system enters recirculation mode for about 10 seconds to about 2 minutes (such as about 10 seconds to about 30 seconds, about 30 seconds to about 60 seconds, or about 60 seconds to about 2 minutes) before stopping. In some embodiments, the computer system automatically operates the reagent delivery system in recirculation mode for a predetermined periodicity. For example, in some embodiments the computer system operates the reagent delivery system in recirculation mode in a period of 30 seconds or more, 60 seconds or more, 2 minutes or more, 3 minutes or more, 5 minutes or more, or 10 minutes or more).

In some embodiments, the reagent delivery system is operated (for example, by the computer system) in a recirculation mode upon the low-level liquid sensor detecting an absence of liquid. That is, the pump system can be operable to pump a liquid contained with the liquid reservoir to the reagent trough upon the low-level liquid sensor detecting an absence of liquid. When the level of liquid in the reagent trough is below the level of the low-level liquid sensor, the low-level liquid sensor detects the absence of the liquid and can send a signal to the computer system. The computer system can then operate the pump system in a recirculation mode by activating the first pump and the second pump and operating the control valve in a closed position upon the low-level liquid sensor detecting an absence of the liquid. The liquid can then be pumped into the reagent through the second liquid port of the reagent trough. In some embodiments, the reagent delivery system remains in recirculation mode (that is, with the first pump and second pump activated and the control valve in the closed position) until the level of the liquid in the reagent trough is at the level of the first liquid port of the reagent trough. In some embodiments, when the liquid in the reagent trough is at the level of the first liquid port of the reagent trough, air bubbles suspended in the liquid can be drawn in the pump system via the first liquid port of the reagent trough (which is fluidly connected to the second supply port of the pump system). A bubble sensor disposed in the pump system can detect the bubbles in one or more conduits of the pump system. The bubbles indicated that the liquid in the reagent trough is at the level of the first liquid port of the reagent trough. In some embodiments, the bubble sensor transmits a signal to the computer system upon detecting bubbles, which can deactivate the first pump and the second pump of the pump system.

In some embodiments, the computer system operates the reagent delivery system in a fill mode. When the reagent delivery system is operated in the fill mode, the first pump is active, the second pump is inactive, and the control valve is in a closed position. The pump system pumps liquid from the liquid reservoir in to the reagent trough. The first pump draws liquid into the pump system from the liquid reservoir and through the first reservoir port of the pump system. Once in the pump system, the liquid flows through the first conduit, the first pump, the second conduit, the first junction, the third conduit, and out of the pump system through the first liquid supply port. The first liquid supply port is fluidly connected to the second liquid port of the reagent trough, and the liquid flows into the reagent through via the second liquid port of the reagent trough.

In some embodiments, the reagent delivery system is operated (for example, by the computer system) in a fill mode upon the low-level liquid sensor detecting an absence of liquid. That is, the pump system can be operable to pump a liquid contained with the liquid reservoir to the reagent trough upon the low-level liquid sensor detecting an absence of liquid. When the level of liquid in the reagent trough is below the level of the low-level liquid sensor, the low-level liquid sensor detects the absence of the liquid and can send a signal to the computer system. The computer system can then operate the pump system in a fill mode by activating the first pump and operating the control valve in a closed position upon the low-level liquid sensor detecting an absence of the liquid. The liquid can then be pumped into the reagent through the second liquid port of the reagent trough. In some embodiments, the reagent delivery system remains in fill mode (that is, with the first pump activated and the control valve in the closed position) until the level of the liquid in the reagent trough is at the level of the high-level liquid sensor. In some embodiments, upon the high-level liquid sensor detecting the liquid, the high-level liquid sensor can send a signal to the computer system (for example, via the data port), which can deactivate the first pump. In some embodiments, the reagent delivery system remains in fill mode (that is, with the first pump activated and the control valve in the closed position) until the liquid flows into the inlet of the overflow drain. In some embodiments, the overflow drain comprises or is connected to a flow sensor, which can detect liquid flowing into the overflow drain or out of the outlet of the overflow drain. The flow sensor can be connected to the computer system and, upon detecting a fluid in the overflow drain, transmit a signal to the computer system. When the computer system receives the signal from the flow sensor, the computer system can deactivate the first pump.

In some embodiments, the reagent delivery system is operated (for example, by the computer system) in a fill mode to test the high-level liquid sensor. That is, the pump system can be operable to pump a liquid contained with the liquid reservoir to the reagent trough upon initiating a test of the high-level liquid sensor. In some embodiments, the test of the high-level liquid sensor is triggered manually, for example by a user providing instructions to the computer system to test the high-level liquid sensor. In some embodiments, the test of the high-level liquid sensor is triggered automatically, for example by the computer system. In some embodiments, the computer system automatically tests the high-level liquid sensor after a period of 1 day or more (such as a period of 2 days or more, 5 days or more, 7 days or more, 14 days or more, or one month or more). To test the high-level liquid sensor, the computer system operates the pump system in a fill mode by activating the first pump and operating the control valve in a closed position. The liquid can then be pumped into the reagent through the second liquid port of the reagent trough. The reagent delivery system remains in fill mode (that is, with the first pump activated and the control valve in the closed position) until the level of the liquid in the reagent trough is at the level of the high-level liquid sensor. Upon the high-level liquid sensor detecting the liquid, the high-level liquid sensor can send a signal to the computer system (for example, via the data port), which deactivates the first pump. In some embodiments, the computer records proper function of the high-level liquid sensor after a signal is received from the high-level liquid senor.

In some embodiments, the reagent delivery system is operated by a computer system in an empty mode to drain liquid contained within the reagent trough. When the reagent delivery system is operated in the empty mode, the second pump is active, the first pump is inactive, and the control valve is in an opened position. Because the second pump is active, the liquid is actively drained form the reagent trough by the pump system. The pump system pumps liquid from the reagent trough to the liquid reservoir. The second pump draws liquid into the pump system from the reagent trough and through the first liquid supply port of the pump system. Once in the pump system, the liquid flows through the third conduit, the first junction, the control valve (which is in the open position), the second junction, the fifth conduit, the second pump, the sixth conduit, and out of the pump system through the second liquid reservoir port to the liquid reservoir. The first liquid supply port is fluidly connected to the second liquid port of the reagent trough, and the liquid flows into the pump system via the second liquid port of the reagent trough. In some embodiments, a one-way valve is disposed along the second conduit, which prevents liquid flowing into the first junction from traveling through the second conduit and into the first pump. If the liquid in the reservoir trough is at or above the level of the second liquid port of the reagent trough, liquid can flow through the second liquid port of the reagent trough and into the pump system via the second liquid supply port of the pump system, through the fourth conduit, the second junction, the fifth conduit, the second pump, the six conduit, and out of the pump system through the second liquid reservoir port to the liquid reservoir.

In some embodiments, the reagent delivery system is operated (for example, by the computer system) in an empty mode to test the low-level liquid sensor. That is, the pump system can be operable to drain a liquid contained in the reagent trough upon initiating a test of the low-level liquid sensor. In some embodiments, the test of the low-level liquid sensor is triggered manually, for example by a user providing instructions to the computer system to test the low-level liquid sensor. In some embodiments, the test of the low-level liquid sensor is triggered automatically, for example by the computer system. In some embodiments, the computer system automatically tests the low-level liquid sensor after a period of 1 day or more (such as a period of 2 days or more, 5 days or more, 7 days or more, 14 days or more, or one month or more). To test the low-level liquid sensor, the computer system operates the pump system in an empty mode by activating the second pump and operating the control valve in an opened position. The liquid can then be actively drained from the reagent through the second liquid port of the reagent trough. The reagent delivery system remains in empty mode (that is, with the second pump activated and the control valve in the opened position) until the level of the liquid in the reagent trough is below the level of the low-level liquid sensor, which causes the low-level liquid sensor to detect the absence of the liquid. Upon the low-level liquid sensor detecting the absence of the liquid, the low-level liquid sensor can send a signal to the computer system (for example, via the data port), which deactivates the second pump (and, optionally closes the control valve). In some embodiments, the computer records proper function of the low-level liquid sensor after a signal is received from the high-level liquid senor. In some embodiments, the reagent delivery system is operated in a recirculation mode or a fill mode after testing the low-level liquid sensor.

In some embodiments, the reagent delivery system is operated to test the high-level liquid sensor and the low-level liquid sensor. For example, in some embodiments, the reagent delivery system is operated in a fill mode until the high-level liquid sensor detects a liquid, and then operated in empty mode until the low-level liquid sensor detects the absence of the liquid. In some embodiments, the reagent delivery system is operated in empty mode until the low-level liquid sensor detects the absence of the liquid, and then operated in a fill mode until the high-level liquid sensor detects a liquid. In some embodiments, after the high-level liquid sensor and the low-level liquid sensor are tested, the reagent delivery system operates in a recirculation mode. In some embodiments, the reagent delivery system is operated to test the high-level liquid sensor and the low-level liquid sensor at a predetermined frequency, such as after a period of 1 day or more (such as a period of 2 days or more, 5 days or more, 7 days or more, 14 days or more, or one month or more).

In some embodiments, the reagent delivery system further comprises a pipette system. The pipette system can be operable to withdraw liquid from the reagent trough into a pipette tip. The pipette system can then dispense the liquid in a target area, such as a well on a plate. In some embodiments, the pipette system dispenses the liquid in a liquid waste input (such as a gravity-based waste input) of a waste management system. For example, a pipette system can pipette a biological sample, causing the pipette tip to become contaminated. The pipette system can then withdraw a sterilizing liquid (such as bleach or ethanol) contained within a reagent trough to sterilize the pipette tips, and the liquid (now a liquid waste) can then be dispensed into the liquid waste input. In some embodiments, the pipette system is operable to withdraw a liquid (such as a buffer, such as a wash buffer) from a reagent trough and dispense the buffer into a well of a plate. In some e embodiments, the pipette system can then withdraw a liquid contained within the well of the plate (which is now a waste liquid) and dispense the liquid into a liquid waste input. In some embodiments, the pipette system is a multi-channel pipette system (that is, the pipette system includes or can be configured to include a plurality of pipette tips). The multi-channel pipette system can include one or more rows of pipette tips. For example, in some embodiments, a pipette system includes one or more rows (such as two or more, three or more, four or more, five or more, six or more, seven or more, or eight or more rows), wherein each row includes two or more pipette tips (such as three or more, four or more, five or more, six or more, seven or more, eight or more, nine or more, ten or more, eleven or more, or twelve or more) pipette tips. The length and width of the reagent trough vessel in the reagent system can selected depending on the configuration (i.e., how many rows and how many pipette tips in each row) of the pipette system.

In some embodiments, a reagent delivery system comprises a pump system as described herein; a liquid reservoir fluidly connected to the first liquid reservoir port and the second liquid reservoir port; and a reagent trough fluidly connected to the first liquid supply port and the second liquid supply port. In some embodiments, the reagent delivery system further comprises a pipette system (such as a multi-channel pipette system), which is optionally operable to draw a liquid from the reagent trough and dispense a liquid waste into a liquid waste input of a waste management system.

In some embodiments, a reagent delivery system comprises a pump system comprising a first liquid reservoir port connected to a first pump by a first conduit; a first junction connected to the first pump by a second conduit; a first liquid supply port connected to the first junction by a third conduit; a second liquid supply port connected to a second junction by a fourth conduit; a control valve connecting the first junction and the second junction; a second pump connected to the second junction by a fifth conduit; and a second liquid reservoir port connected to the second pump by a sixth conduit; a liquid reservoir fluidly connected to the first liquid reservoir port and the second liquid reservoir port; and a reagent trough fluidly connected to the first liquid supply port and the second liquid supply port. In some embodiments, the pump system is contained within a housing. In some embodiments, the pump system further comprises a spill sensor (which is optionally connected to a data port) disposed within the housing. In some embodiments, the data port is connected to a computer system operable to control the control valve, the first pump, or the second pump. In some embodiments, the reagent delivery system further comprises a pipette system (such as a multi-channel pipette system), which is optionally operable to draw a liquid from the reagent trough and dispense a liquid waste into a liquid waste input of a waste management system.

In some embodiments, a reagent delivery system comprises a pump system comprising a first liquid reservoir port connected to a first pump by a first conduit; a first junction connected to the first pump by a second conduit; a first liquid supply port connected to the first junction by a third conduit; a second liquid supply port connected to a second junction by a fourth conduit; a stop-flow valve connecting the first junction and the second junction; a second pump connected to the second junction by a fifth conduit; and a second liquid reservoir port connected to the second pump by a sixth conduit; a liquid reservoir fluidly connected to the first liquid reservoir port and the second liquid reservoir port; and a reagent trough fluidly connected to the first liquid supply port and the second liquid supply port. In some embodiments, the pump system is contained within a housing. In some embodiments, the pump system further comprises a spill sensor (which is optionally connected to a data port) disposed within the housing. In some embodiments, the data port is connected to a computer system operable to control the stop-flow valve, the first pump, or the second pump. In some embodiments, the reagent delivery system further comprises a pipette system (such as a multi-channel pipette system), which is optionally operable to draw a liquid from the reagent trough and dispense a liquid waste into a liquid waste input of a waste management system.

In some embodiments, a reagent delivery system comprises a pump system comprising a first liquid reservoir port connected to a first pump by a first conduit; a first junction connected to the first pump by a second conduit; a one-way valve disposed along the second conduit; a first liquid supply port connected to the first junction by a third conduit; a second liquid supply port connected to a second junction by a fourth conduit; a stop-flow valve connecting the first junction and the second junction; a second pump connected to the second junction by a fifth conduit; and a second liquid reservoir port connected to the second pump by a sixth conduit; a liquid reservoir fluidly connected to the first liquid reservoir port and the second liquid reservoir port; and a reagent trough fluidly connected to the first liquid supply port and the second liquid supply port. In some embodiments, the pump system is contained within a housing. In some embodiments, the pump system further comprises a spill sensor (which is optionally connected to a data port) disposed within the housing. In some embodiments, the data port is connected to a computer system operable to control the stop-flow valve, the first pump, or the second pump. In some embodiments, the reagent delivery system further comprises a pipette system (such as a multi-channel pipette system), which is optionally operable to draw a liquid from the reagent trough and dispense a liquid waste into a liquid waste input of a waste management system.

In some embodiments, a reagent delivery system comprises a pump system comprising a first liquid reservoir port connected to a first pump by a first conduit; a first junction connected to the first pump by a second conduit; a one-way valve disposed along the second conduit; a first liquid supply port connected to the first junction by a third conduit; a second liquid supply port connected to a second junction by a fourth conduit; a stop-flow valve connecting the first junction and the second junction; a second pump connected to the second junction by a fifth conduit; a second liquid reservoir port connected to the second pump by a sixth conduit; and a data port connected to the stop-flow valve, the first pump, and the second pump; a liquid reservoir fluidly connected to the first liquid reservoir port and the second liquid reservoir port; and a reagent trough fluidly connected to the first liquid supply port and the second liquid supply port. In some embodiments, the pump system is contained within a housing. In some embodiments, the pump system further comprises a spill sensor (which is optionally connected to a data port) disposed within the housing. In some embodiments, the data port is connected to a computer system operable to control the stop-flow valve, the first pump, or the second pump. In some embodiments, the reagent delivery system further comprises a pipette system (such as a multi-channel pipette system), which is optionally operable to draw a liquid from the reagent trough and dispense a liquid waste into a liquid waste input of a waste management system.

In some embodiments, a reagent delivery system comprises a pump system comprising a first liquid reservoir port connected to a first pump by a first conduit; a first junction connected to the first pump by a second conduit; a one-way valve disposed along the second conduit; a first liquid supply port connected to the first junction by a third conduit; a second liquid supply port connected to a second junction by a fourth conduit; a stop-flow valve connecting the first junction and the second junction; a second pump connected to the second junction by a fifth conduit; a second liquid reservoir port connected to the second pump by a sixth conduit; a bubble sensor operable to detect bubbles in one or more of the conduits (such as the fourth conduit, the fifth conduit, or the sixth conduit); and a data port connected to the stop-flow valve, the first pump, the second pump, and the bubble sensor; a liquid reservoir fluidly connected to the first liquid reservoir port and the second liquid reservoir port; and a reagent trough fluidly connected to the first liquid supply port and the second liquid supply port. In some embodiments, the pump system is contained within a housing. In some embodiments, the pump system further comprises a spill sensor (which is optionally connected to a data port) disposed within the housing. In some embodiments, the data port is connected to a computer system operable to control the stop-flow valve, the first pump, or the second pump. In some embodiments, the reagent delivery system further comprises a pipette system (such as a multi-channel pipette system), which is optionally operable to draw a liquid from the reagent trough and dispense a liquid waste into a liquid waste input of a waste management system.

In some embodiments, a reagent delivery system comprises a pump system as described herein; a liquid reservoir fluidly connected to the first liquid reservoir port and the second liquid reservoir port; and a reagent trough as described herein fluidly connected to the first liquid supply port and the second liquid supply port. In some embodiments, the reagent delivery system further comprises a pipette system (such as a multi-channel pipette system), which is optionally operable to draw a liquid from the reagent trough and dispense a liquid waste into a liquid waste input of a waste management system.

In some embodiments, a reagent delivery system comprises a pump system comprising a first liquid reservoir port connected to a first pump by a first conduit, a first junction connected to the first pump by a second conduit, a first liquid supply port connected to the first junction by a third conduit, a second liquid supply port connected to a second junction by a fourth conduit, a control valve connecting the first junction and the second junction, a second pump connected to the second junction by a fifth conduit, and a second liquid reservoir port connected to the second pump by a sixth conduit, a liquid reservoir fluidly connected to the first liquid reservoir port and the second liquid reservoir port, and a reagent trough comprising a vessel comprising a bottom and a sidewall, a high-level liquid sensor on the sidewall, a low-level liquid sensor on the sidewall positioned lower than the high-level liquid sensor, a first liquid port positioned lower than the high-level liquid sensor, wherein the first liquid port is fluidly connected to the second liquid supply port of the pump system, and a second liquid port positioned lower than the first liquid port, wherein the second liquid port is fluidly connected to the first liquid supply port of the pump system. In some embodiments, the pump system is contained within a housing. In some embodiments, the pump system further comprises a spill sensor (which is optionally connected to a data port) disposed within the housing. In some embodiments, the data port is connected to a computer system operable to control the control valve, the first pump, or the second pump. In some embodiments, the high-level liquid sensor and the low-level liquid sensor are connected to a data port on the reagent trough, which is optionally connected to the computer system. In some embodiments, the high-level liquid sensor is a conductive sensor or a capacitive sensor. In some embodiments, the low-level liquid sensor is a conductive sensor or a capacitive sensor. In some embodiments, the reagent delivery system further comprises a pipette system (such as a multi-channel pipette system), which is optionally operable to draw a liquid from the reagent trough and dispense a liquid waste into a liquid waste input of a waste management system.

In some embodiments, a reagent delivery system comprises a pump system comprising a first liquid reservoir port connected to a first pump by a first conduit, a first junction connected to the first pump by a second conduit, a first liquid supply port connected to the first junction by a third conduit, a second liquid supply port connected to a second junction by a fourth conduit, a stop-flow valve connecting the first junction and the second junction, a second pump connected to the second junction by a fifth conduit, and a second liquid reservoir port connected to the second pump by a sixth conduit; a liquid reservoir fluidly connected to the first liquid reservoir port and the second liquid reservoir port; and a reagent trough comprising a vessel comprising a bottom and a sidewall, a high-level liquid sensor on the sidewall, a low-level liquid sensor on the sidewall positioned lower than the high-level liquid sensor, a first liquid port positioned lower than the high-level liquid sensor, wherein the first liquid port is fluidly connected to the second liquid supply port of the pump system, and a second liquid port positioned lower than the first liquid port and the low-level liquid sensor, wherein the second liquid port is fluidly connected to the first liquid supply port of the pump system. In some embodiments, the pump system is contained within a housing. In some embodiments, the pump system further comprises a spill sensor (which is optionally connected to a data port) disposed within the housing. In some embodiments, the data port is connected to a computer system operable to control the stop-flow valve, the first pump, or the second pump. In some embodiments, the high-level liquid sensor and the low-level liquid sensor are connected to a data port on the reagent trough, which is optionally connected to the computer system. In some embodiments, the high-level liquid sensor is a conductive sensor or a capacitive sensor. In some embodiments, the low-level liquid sensor is a conductive sensor or a capacitive sensor. In some embodiments, the reagent delivery system further comprises a pipette system (such as a multi-channel pipette system), which is optionally operable to draw a liquid from the reagent trough and dispense a liquid waste into a liquid waste input of a waste management system.

In some embodiments, a reagent delivery system comprises a pump system comprising a first liquid reservoir port connected to a first pump by a first conduit, first junction connected to the first pump by a second conduit, a one-way valve disposed along the second conduit, a first liquid supply port connected to the first junction by a third conduit, a second liquid supply port connected to a second junction by a fourth conduit, a stop-flow valve connecting the first junction and the second junction, a second pump connected to the second junction by a fifth conduit, and a second liquid reservoir port connected to the second pump by a sixth conduit, a liquid reservoir fluidly connected to the first liquid reservoir port and the second liquid reservoir port, and a reagent trough comprising a vessel comprising a bottom and a sidewall, a high-level liquid sensor on the sidewall, a low-level liquid sensor on the sidewall positioned lower than the high-level liquid sensor, a first liquid port positioned lower than the high-level liquid sensor, wherein the first liquid port is fluidly connected to the second liquid supply port of the pump system, and a second liquid port positioned lower than the first liquid port and the low-level liquid sensor, wherein the second liquid port is fluidly connected to the first liquid supply port of the pump system. In some embodiments, the pump system is contained within a housing. In some embodiments, the pump system further comprises a spill sensor (which is optionally connected to a data port) disposed within the housing. In some embodiments, the data port is connected to a computer system operable to control the stop-flow valve, the first pump, or the second pump. In some embodiments, the high-level liquid sensor and the low-level liquid sensor are connected to a data port on the reagent trough, which is optionally connected to the computer system. In some embodiments, the high-level liquid sensor is a conductive sensor or a capacitive sensor. In some embodiments, the low-level liquid sensor is a conductive sensor or a capacitive sensor. In some embodiments, the reagent delivery system further comprises a pipette system (such as a multi-channel pipette system), which is optionally operable to draw a liquid from the reagent trough and dispense a liquid waste into a liquid waste input of a waste management system.

In some embodiments, a reagent delivery system comprises a pump system comprising a first liquid reservoir port connected to a first pump by a first conduit; a first junction connected to the first pump by a second conduit; a one-way valve disposed along the second conduit; a first liquid supply port connected to the first junction by a third conduit; a second liquid supply port connected to a second junction by a fourth conduit; a stop-flow valve connecting the first junction and the second junction; a second pump connected to the second junction by a fifth conduit; a second liquid reservoir port connected to the second pump by a sixth conduit; and a data port connected to the stop-flow valve, the first pump, and the second pump; a liquid reservoir fluidly connected to the first liquid reservoir port and the second liquid reservoir port; and a reagent trough comprising a vessel comprising a bottom and a sidewall, a high-level liquid sensor on the sidewall, a low-level liquid sensor on the sidewall positioned lower than the high-level liquid sensor, a first liquid port positioned lower than the high-level liquid sensor, wherein the first liquid port is fluidly connected to the second liquid supply port of the pump system, a second liquid port positioned lower than the first liquid port and the low-level liquid sensor, wherein the second liquid port is fluidly connected to the first liquid supply port of the pump system, and an overflow drain comprising an inlet and an outlet, the inlet positioned above the first liquid port. In some embodiments, the pump system is contained within a housing. In some embodiments, the pump system further comprises a spill sensor (which is optionally connected to a data port) disposed within the housing. In some embodiments, the data port is connected to a computer system operable to control the stop-flow valve, the first pump, or the second pump. In some embodiments, the inlet is perpendicular to the sidewall. In some embodiments, the outlet of the overflow drain is fluidly connected to a waste management system. In some embodiments, the high-level liquid sensor and the low-level liquid sensor are connected to a data port on the reagent trough, which is optionally connected to the computer system. In some embodiments, the high-level liquid sensor is a conductive sensor or a capacitive sensor. In some embodiments, the low-level liquid sensor is a conductive sensor or a capacitive sensor. In some embodiments, the reagent delivery system further comprises a pipette system (such as a multi-channel pipette system), which is optionally operable to draw a liquid from the reagent trough and dispense a liquid waste into a liquid waste input of a waste management system.

In some embodiments, a reagent delivery system comprises a pump system comprising a first liquid reservoir port connected to a first pump by a first conduit; a first junction connected to the first pump by a second conduit; a one-way valve disposed along the second conduit; a first liquid supply port connected to the first junction by a third conduit; a second liquid supply port connected to a second junction by a fourth conduit; a stop-flow valve connecting the first junction and the second junction; a second pump connected to the second junction by a fifth conduit; a second liquid reservoir port connected to the second pump by a sixth conduit; a bubble sensor operable to detect bubbles in one or more of the conduits (such as the fourth conduit, the fifth conduit, or the sixth conduit); and a data port connected to the stop-flow valve, the first pump, the second pump, and the bubble sensor; a liquid reservoir fluidly connected to the first liquid reservoir port and the second liquid reservoir port; and a reagent trough comprising a vessel comprising a bottom and a sidewall, a high-level liquid sensor on the sidewall, a low-level liquid sensor on the sidewall positioned lower than the high-level liquid sensor, a first liquid port positioned lower than the high-level liquid sensor, wherein the first liquid port is fluidly connected to the second liquid supply port of the pump system, a second liquid port positioned lower than the first liquid port and the low-level liquid sensor, wherein the second liquid port is fluidly connected to the first liquid supply port of the pump system, and an overflow drain comprising an inlet and an outlet, the inlet positioned above the first liquid port. In some embodiments, the pump system is contained within a housing. In some embodiments, the pump system further comprises a spill sensor (which is optionally connected to a data port) disposed within the housing. In some embodiments, the data port is connected to a computer system operable to control the stop-flow valve, the first pump, or the second pump. In some embodiments, the inlet is perpendicular to the sidewall. In some embodiments, the outlet of the overflow drain is fluidly connected to a waste management system. In some embodiments, the high-level liquid sensor and the low-level liquid sensor are connected to a data port on the reagent trough, which is optionally connected to the computer system. In some embodiments, the high-level liquid sensor is a conductive sensor or a capacitive sensor. In some embodiments, the low-level liquid sensor is a conductive sensor or a capacitive sensor. In some embodiments, the reagent delivery system further comprises a pipette system (such as a multi-channel pipette system), which is optionally operable to draw a liquid from the reagent trough and dispense a liquid waste into a liquid waste input of a waste management system.

Waste Management Systems

In some embodiments, liquid waste from a high-throughput sample processing system is transported to a waste management system, where it can be treated, stored, and/or disposed. The waste management system includes one or more liquid waste inputs, which can receive a liquid waste. The liquid waste can originate from a reagent trough (which may be part of a reagent delivery system). For example, in some embodiments a pipette system can withdraw a liquid from a reagent trough and dispense the liquid in a liquid waste input. In some embodiments, a pipette system can withdraw a waste liquid from a plate (such as a sample plate) and dispense the waste liquid in a liquid waste input.

The waste management system can comprises one or more conduits or vessels that contact with the liquid waste. In some embodiments, the one or more conduits or vessels comprise a chemically resist material, such as polytetrafluoroethylene.

Liquid waste may be produced, for example, from the pipette system (e.g., liquid withdrawn from a reagent trough in a reagent delivery system or liquid withdrawn from a plate), aspirated liquid from a plate using a liquid aspirator, or liquid from priming of a liquid dispenser. In some embodiments, a waste management system can treat and dispose of more than about 10 liters of liquid waste per day, more than about 20 liters of liquid waste per day, more than about 40 liters of liquid waste per day, more than about 60 liters of liquid waste per day, more than 100 liters of liquid per day, more than 200 liters of liquid per day, more than 500 liters of liquid per day, or more than 1000 liters of liquid per day.

Figure 5:
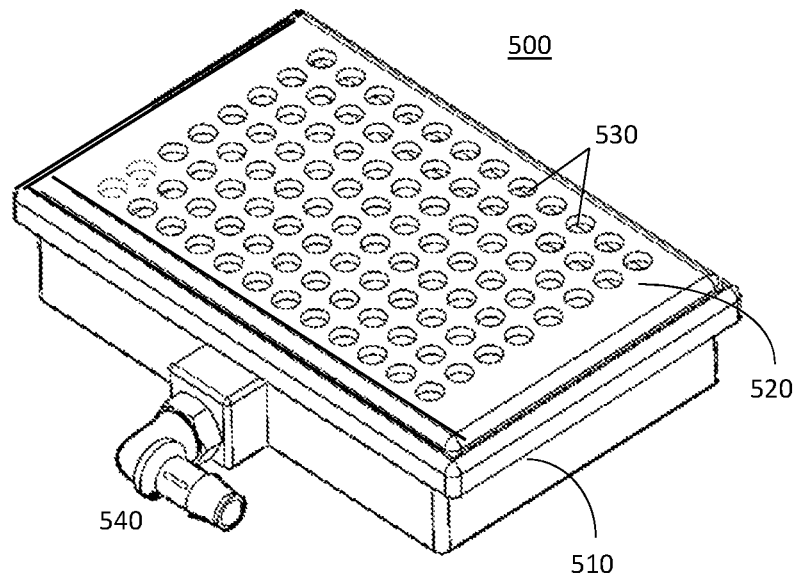
FIG. 5 illustrates one embodiment of a gravity-based liquid waste input.

The liquid waste input can be a gravity-based liquid waste input or a vacuum-based liquid waste input. A gravity-based liquid input receives liquid waste, which can flow into a liquid waste container (which can be fluidly connected to the liquid waste input) under the force of gravity. For example, the gravity-based liquid input can comprise a receiving vessel with an outlet, which can be fluidly connected to the container. A pipette system, for example, can dispense liquid waste into the gravity-based liquid input, and the liquid waste can flow under the force of gravity into the container. In some embodiments, the gravity-based liquid input includes a lid for the vessel, which includes a plurality of apertures. A multi-channel pipette system can then dispense the waste liquid through the apertures. The lid limits the amount of spillage (e.g., from splashing of the liquid waste). In some embodiments, the lid comprises at least one aperture for each pipette tip in a multi-channel pipette system. FIG. 5 illustrates one embodiment of a gravity-based liquid waste input 500. The illustrated gravity-based liquid waste input includes a vessel 510 and a lid 520. The lid 520 includes a plurality of apertures 530. The vessel 510 includes an outlet 540, which can be connected to other components of the waste management system, such as a liquid waste collection vessel, by a conduit.

In some embodiments, a vacuum-based liquid waste input is connected to a dispenser (which can be configured to allow primed liquid to flow into the vacuum-based liquid waste input) or an aspirator (which can pull liquid waste from a source, such as a plate, under a vacuum pressure, and the liquid waste can flow into the waste management system).

In some embodiments, a waste management system comprises a liquid waste input connected to a liquid waste container by a conduit. The liquid waste input can be a gravity-based liquid input. In some embodiments, a pipette system can dispense liquid waste (which may be withdrawn from a reagent trough in a reagent delivery system) into the liquid waste input, which flows into the liquid waste container. In some embodiments, the liquid waste container is connected to a drainage line, which can drain the liquid waste held in the liquid waste container. In some embodiments, a pump (or a lag-lead pump system) is disposed along the drainage line to actively pump the liquid waste through the drainage line (which can lead to, for example, a sewage system).

In some embodiments, the waste management system comprises a first liquid waste input (such as a gravity-based liquid waste input) fluidly connected to a first liquid waste container by a conduit. The waste management system further includes a second waste liquid input connected to the first liquid waste container and a second liquid waste container. A valve (e.g., a three-way valve) can be operable to alternatively direct liquid waste from the second liquid waste input to the first liquid waste container or the second liquid waste container. In some embodiments, a pump is disposed between the valve and the second liquid waste input to actively pump the liquid waste from the second waste input into the first liquid waste container or the second liquid waste container (depending on the configuration of the valve). In some embodiments, the second liquid waste container is connected to a drainage line, which can drain the liquid waste held in the liquid waste container. In some embodiments, a pump (or a lead-lag pump system) is disposed along the drainage line to actively pump the liquid waste through the drainage line. In some embodiments, a suction force (such as a vacuum) is connected to the first liquid waste container or the second liquid waste container, which can pull liquid from the first liquid waste input or the second liquid waste input (such as from a liquid dispenser) to the first liquid waste container or the second liquid waste container. In some embodiments, the first liquid waste container is not connected to a drainage line (which can lead to, for example, a sewage system). In some embodiments, the second liquid waste input is connected to a liquid dispenser. This configuration is useful, for example, when the liquid dispenser dispenses a chemical (such as guanidinium thiocyanate) that cannot be safely disposed of in a sewage system and would need to be removed through more expensive chemical waste management. However, the liquid dispenser way also be washed with a non-hazardous liquid, such as water, which can be disposed of in a sewage system. When the liquid dispenser is being primed with the chemical, the valve can operated to direct the liquid waste (that is, the excess primed chemical) into the first liquid waste container. When the liquid dispenser is being washed or primed with a non-hazardous liquid (such as water), the valve can be operated to direct the liquid waste into the second liquid waste container. Accordingly, the non-hazardous liquid waste is collected in the second liquid waste container and the chemical is collected in the first liquid waste container. The chemical can be dispensed by the liquid dispenser into a plate, and the chemical can be removed from the plate, for example, by a pipette system. The pipette system can then dispense the chemical waste into the first liquid waste input, which is connected to the first liquid waste container. In some embodiments, a scale or other device can be used to measure the amount of liquid in the first liquid waste container or the second liquid waste container.

Figure 6:
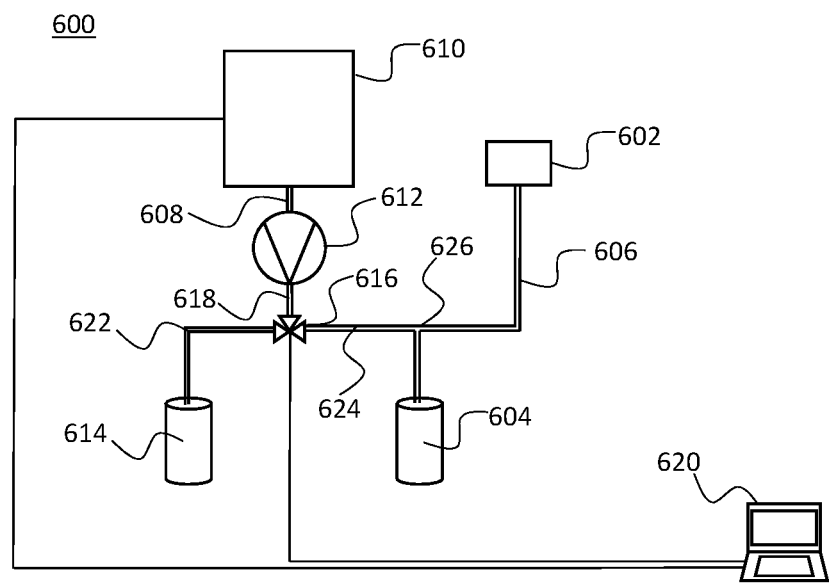
FIG. 6 illustrates one embodiment of a waste management system.

FIG. 6 illustrates one embodiment of a waste management system. The waste management system 600 includes a first liquid waste input 602 connected to a first liquid waste container 604 by a first conduit 606. The first liquid waste input 602 can be a gravity-based liquid waste input, for example the gravity-based liquid waste input illustrated in FIG. 5. The waste management system 600 further includes a second liquid waste input 608 (which can be a conduit, as illustrated) that fluidly connects a liquid dispenser 610 to a pump 612. The liquid dispenser 610 includes a priming line, and excess primed liquid can flow into the second liquid waste input 608. The second liquid waste input is connected to the first liquid waste container 604 and a second liquid waste container 614. The waste management system 600 includes a valve 616 (such as a three-way valve) operable to alternatively direct liquid waste from the second liquid waste input 608 to the first liquid waste container 604 or the second liquid waste container 614. A third conduit 618 can fluidly connect the pump 612 to the valve 616. The valve 616 is optionally operated by a computer system 620, which can also operate the liquid dispenser 610. The computer system can operate the valve 616 to direct a first type of liquid waste (such as a chemical waste) into the first liquid waste container 605 when the liquid dispenser 610 produces (for example, during priming) the first liquid waste, and to direct a second type of liquid waste (such as a non-hazardous liquid waste) into the second liquid waste container 614 when the liquid dispenser 610 produces (for example, during priming) the second liquid waste. The valve 616 is fluidly connected to the second liquid waste container 614 by a fourth conduit 622. The valve 616 is also fluidly connected to the first liquid waste container 604 by a fifth conduit 624 that joins the first conduit at a junction 626.

Figure 7:
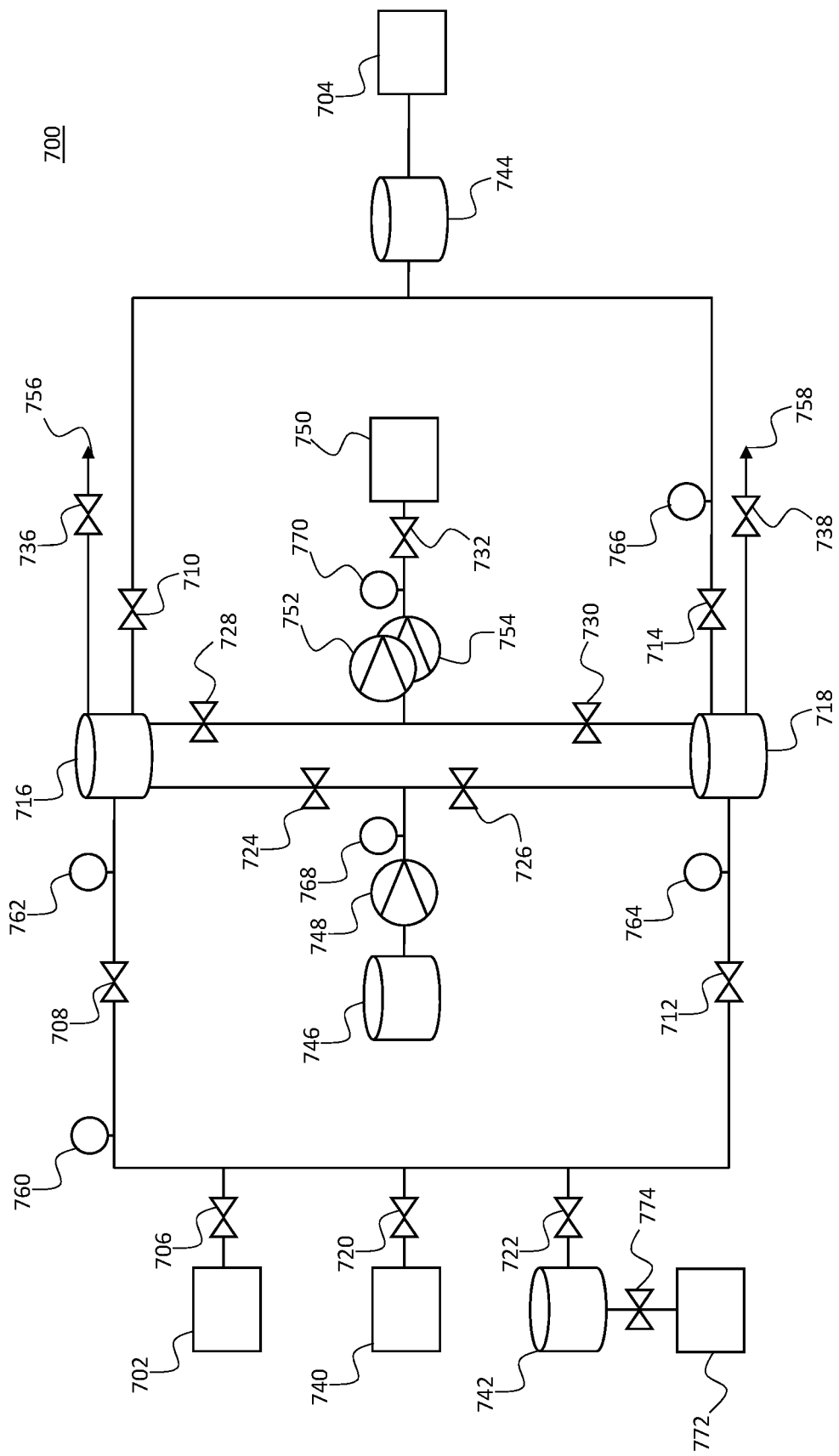
FIG. 7 illustrates another embodiment of a waste management system.

FIG. 7 illustrates one embodiment of a waste management system 700 that can be used with a reagent delivery system or a high-throughput sample processing system. Waste can be collected by the waste management system 700 using gravity or suction forces. In some embodiments, the suction forces (such as a vacuum or pump) are used to pull liquid from a liquid aspirator 702 or a liquid dispenser 740 (for example, after priming a liquid dispenser) through one or more vacuum-based liquid waste inputs. In some embodiments, gravity can be used to collect liquid waste in a gravity-based liquid input 742 (such as the gravity-based liquid input illustrated in FIG. 5). The waste management system 700 illustrated in FIG. 7 can accept waste from a gravity-based liquid input 742 and a vacuum-based liquid input, such as from the liquid aspirator 702 or the liquid dispenser 740.

In some embodiments, liquid waste from the liquid aspirator 702 flows into the waste management system 700 using a suction force provided by suction source 704, such as a vacuum or blower. In some embodiments, the suction source 704 provides a pressure of less than about −10 mmHg relative to ambient, less than about −15 mmHg relative to ambient, less than about −20 mmHg relative to ambient, or less than about −30 mmHg relative to ambient. The suction force 704 can be fluidly connected to the liquid aspirator 702 by opening valve 706 (which controls flow from the liquid aspirator 702 into the waste management system 700), and alternatively opening) valve 708 and valve 710, or valve 712 and 714. When valve 706, valve 708, and valve 710 are open, the suction source 704 can pull liquid from the liquid aspirator 702 into a first liquid waste container 716. When valve 706, valve 712, and valve 714 are open, the suction source 704 can pull liquid from the liquid aspirator 702 into a second liquid waste container 718. Valve 720, valve 722, valve 724, valve 726, valve 728, valve 730, valve 734, and valve 736 are preferably closed when liquid is being pulled from the liquid aspirator 702 into the first liquid waste container 716 or the second liquid waste container 718.

Additionally, valve 712 and valve 714 are preferably closed when valve 708 and valve 710 are open, and valve 708 and valve 710 are preferably closed when valve 712 and valve 714 are open.

In some embodiments, liquid waste from the liquid dispenser 740 flows into the waste management system 700 using a suction force provided by the suction source 704. The suction force 704 can be fluidly connected to the liquid dispenser 740 by opening valve 720 (which controls flow from the liquid dispenser 740 into the waste management system 700), and alternatively opening) valve 708 and valve 710, or valve 712 and 714. When valve 720, valve 708, and valve 710 are open, the suction source 704 can pull liquid from the liquid dispenser 740 into the first liquid waste container 716. When valve 720, valve 712, and valve 714 are open, the suction source 704 can pull liquid from the liquid dispenser 740 into a second liquid waste container 718. Valve 706, valve 722, valve 724, valve 726, valve 728, valve 730, valve 734, and valve 736 are preferably closed when liquid is being pulled from the liquid dispenser 740 into the first liquid waste container 716 or the second liquid waste container 718. Additionally, valve 712 and valve 714 are preferably closed when valve 708 and valve 710 are open, and valve 708 and valve 710 are preferably closed when valve 712 and valve 714 are open.

In some embodiments, liquid waste from the gravity-based liquid input 742 (which can be dispensed into the gravity-based liquid waste input 742 from a pipette system) flows into the waste management system 700 by opening valve 722. The liquid waste can flow from the gravity-based liquid input 742 into the first liquid waste container 716 or the second liquid waste container 718 under gravity or suction forces (such as a vacuum or pump). For example, in some embodiments, valve 722 and valve 708 are opened and liquid waste flows under a gravity force from the gravity-based liquid input 742 to the first liquid waste container 716. In some embodiments, valve 722, valve 708, and valve 710 are opened and liquid waste flows under a suction force (for example from the suction source 704, such as a vacuum or pump) in to the first liquid waste container 716. In some embodiments, valve 722 and valve 712 are opened and liquid waste flows under a gravity force from the gravity-based liquid input 742 to the second liquid waste container 718. In some embodiments, valve 722, valve 712, and valve 714 are opened and liquid waste flows under a suction force (for example from the suction source 704, such as a vacuum or pump) in to the second liquid waste container 718.

Optionally, the gravity-based liquid input 742 is fluidly connected to a flushing system 772. The flushing system 772 can be any source of an inert liquid, such as water, which can be used to rinse the liquid waste from the gravity-based liquid input 742. A valve 774 can be disposed between the gravity-based liquid input 742 and the flushing system 776, and the valve 774 can be opened to cause the liquid to flow into the gravity-based liquid input 742, thereby rinsing the gravity-based liquid input 742, before the liquid flows into the other components of the waste management system. In some embodiments, a predetermined amount of liquid is used to flush the gravity-based liquid input 742, for example about 5 liters or more (such as 10 liters or more, 20 liters or more, 30 liters or more, or 50 liters or more).

Liquid waste from the gravity-based liquid input 742 or the vacuum-based liquid input (e.g., from the liquid dispenser 740 or the liquid aspirator 702) alternatively flows into the first liquid waste container 716 or the second liquid waste container 718, depending on the open/closed state of the valves in the system. In some embodiments, the waste management system 700 may have more than two liquid waste containers, while in other embodiments the waste management system 700 may have only one liquid waste container. In some embodiments, the first liquid waste container 716 and second liquid waste container 718 are fluidly connected to an overflow container 744, which is fluidly connected to the suction source 704. Liquid waste can flow from the first liquid waste container 716 into the overflow container 744 upon opening valve 710, and can flow from the second liquid waste container 718 into the overflow container 744 upon opening valve 714. Valve 710 or valve 714 can be opened if, for example, the first liquid waste container 716 or the second liquid waste container 718 overflows or the pressure drops blow a predetermined pressure. The overflow container 744 can also be used, for example, as a vacuum ballast to maintain the vacuum in the waste system during operation.

Liquid waste held in the first liquid waste container 716 or the second liquid waste container 718 can be drained from the waste management system 700 to an appropriate location, for example a waste holding container or sewage system 750. Liquid waste in the first liquid waste container 716 can be drained by opening valve 728, and pumping the liquid waste from the first liquid waste container 716 to the waste holding container or sewage system 750. Liquid waste in the second liquid waste container 718 can be drained by opening valve 730, and pumping the liquid waste from the second liquid waste container 718 to the waste holding container or sewage system 750. The liquid waste can be pumped using a pump 752 disposed between the holding container or sewage system 750 and the first liquid waste container 716 or the second liquid waste container 718. In some embodiments, two or more pumps (such as pump 752 and pump 754) can be used, for example in a lead-lag configuration. Optionally, the waste management system can include a valve 732 disposed between the one or more pumps and the holding container or sewage system 750.

The first liquid waste holding container 716 is optionally fluidly connected to a first vent 756, and the second liquid waste holding container 718 is optionally fluidly connected to a second vent 758. Valve 736 can be disposed between the first liquid holding container 716 and the first vent 756, and valve 738 can be disposed between the second liquid holding container 718 and the second vent. In some embodiments, the computer system opens valve 736 to vent the first liquid holding container 716, and opens valve 738 to vent the second liquid holding container 718. The first liquid holding container 716 or the second liquid holding container 718 may be vented, for example, when the pressure in the first liquid holding container 716 or the second liquid holding container 718 rises above a predetermined maximum threshold. In some embodiments, valve 736 and valve 738 are automatic pressure release valves, wherein the pressure is automatically released (i.e., the first liquid holding container 716 or the second liquid waste holding container 718 are vented) when the pressure is at or above a predetermined maximum threshold.

In some embodiments, a sterilizing liquid container 746 comprises sterilizing liquid (for example bleach, hydrogen peroxide, or iodine solution), and is fluidly connected to the first liquid waste container 716 and the second liquid waste container 718. Once the first liquid waste container 716 is at a predetermined capacity, valve 708 and valve 710 can be closed, and valve 724 can be opened. A pump 748 can pump an appropriate amount of sterilizing liquid from the sterilizing liquid container 746 into the first liquid waste container 716. Similarly, once the second liquid waste container 718 is at a predetermined capacity, valve 712 and valve 714 can be closed, and valve 726 can be opened. The pump 748 can pump an appropriate amount of sterilizing liquid from the sterilizing liquid container 746 into the second liquid waste container 718. In some embodiments the amount of sterilizing liquid pumped into the first liquid waste containers 716 or the second liquid waste container 718 is determined by the control system after determining the amount of liquid waste in the first liquid waste containers 716 or the second liquid waste container 718. In some embodiments, the amount of liquid in any one or more of the containers or containers in the waste management system, including the first liquid waste container 716, the second liquid waste container 718, the gravity-based liquid waste input 742, the overflow container 744, or the sterilizing liquid container 746 may be determined. A variety of sensors may be used to determine the amount of liquids in the waste management system. The sensors may include, for example, acoustic sensors, weight sensors, pressure sensors etc.

In some embodiments, after the sterilizing liquid has been injected into the first liquid waste container 716 or the second liquid waste container 718, the liquid waste is incubated for a predetermined period of time, allowing the neutralization of any biohazardous material. In some embodiments, the liquid waste incubates for 5 minutes or more, 15 minutes or more 30 minutes or more, 60 minutes or more or 120 minutes or more. After incubation of the liquid waste, valve 728 or valve 730, along with valve 732 (if present) are opened, and the liquid waste is pumped (for example, using pump 752 and/or pump 754) into the waste holding container or sewage system 750.

In some embodiments, the waste management system includes one or more pressure gauges (such as gauge 760, gauge 762, gauge 764, gauge 766, gauge 768, or gauge 770), which can be used to monitor the pressure at various points within the waste management system. In some embodiments, a computer system monitors and/or records the pressures reported by the one or more pressure gauges.

In some embodiments, the waste management system 700 is operably controlled by a computer system. The computer system can operate any one of the valves or pumps, for example in response to a pressure measured by one or more of the pressure gauges or measured amount of liquid in one or more of the first liquid waste container 716, the second liquid waste container 718, the gravity-based liquid waste input 742, or the overflow container 744. In some embodiments, if any volume, pump flow level, or pressure is above a predetermined value or below a predetermined value, the control system may signal an alarm or terminate the high-throughput sample processing system operation.

In some embodiments, a waste management system comprises a gravity-based liquid waste input; a vacuum-based liquid waste input operatively connected to a liquid aspirator and a liquid dispenser; a sterilizing liquid container operatively connected to at least one liquid waste container; two or more liquid waste containers disposed to alternatively accept liquid waste from said inputs, treat the liquid waste with a sterilizing liquid from said sterilizing liquid container, and incubate the sterilizing liquid in the liquid waste for a predetermined period of time before disposing of the treated liquid waste; and one or more scales for determining the amount of liquid waste collected by the one or more liquid waste containers.

In some embodiments, a waste management system comprises a gravity-based liquid waste input; a vacuum-based liquid waste input; and two or more liquid waste containers disposed to alternatively accept liquid waste from the gravity-based liquid input or the vacuum-based liquid waste input.

In some embodiments, a waste management system comprises a gravity-based liquid waste input; a vacuum-based liquid waste input fluidly connected to a pump; and two or more liquid waste containers disposed to alternatively accept liquid waste from the gravity-based liquid input or the vacuum-based liquid waste input.

In some embodiments, a waste management system comprises a gravity-based liquid waste input; a vacuum-based liquid waste input; two or more liquid waste containers disposed to alternatively accept liquid waste from the gravity-based liquid input or the vacuum-based liquid waste input; and a sterilizing liquid container operatively connected to at least one liquid waste container. In some embodiments, the waste management system is operable to treat the liquid waste with a sterilizing liquid from said sterilizing liquid container, and incubate the sterilizing liquid in the liquid waste for a predetermined period of time before disposing of the treated liquid waste.

In some embodiments, a waste management system comprises a gravity-based liquid waste input; a vacuum-based liquid waste input; two or more liquid waste containers disposed to alternatively accept liquid waste from the gravity-based liquid input or the vacuum-based liquid waste input; a sterilizing liquid container operatively connected to at least one liquid waste container; and In some embodiments, a waste management system comprises a gravity-based liquid waste input; a vacuum-based liquid waste input; two or more liquid waste containers disposed to alternatively accept liquid waste from the gravity-based liquid input or the vacuum-based liquid waste input; and a sterilizing liquid container operatively connected to at least one liquid waste container. In some embodiments, the waste management system is operable to treat the liquid waste with a sterilizing liquid from said sterilizing liquid container, and incubate the sterilizing liquid in the liquid waste for a predetermined period of time before disposing of the treated liquid waste. In some embodiments, the waste management system is operable to treat the liquid waste with a sterilizing liquid from said sterilizing liquid container, and incubate the sterilizing liquid in the liquid waste for a predetermined period of time before disposing of the treated liquid waste.

In some embodiments, a waste management system comprises a gravity-based liquid waste input operatively connected to a first liquid waste container; a vacuum-based liquid waste input operable to alternatively flow a second liquid waste into the first waste container or a second waste container.

In some embodiments, the waste management system comprises a gravity-based liquid waste input; a vacuum-based liquid waste input operatively connected to a liquid aspirator and a liquid dispenser; a sterilizing liquid container operatively connected to at least one liquid waste container; two or more liquid waste containers disposed to alternatively accept liquid waste from said inputs, treat the liquid waste with a sterilizing liquid from said sterilizing liquid container, and incubate the sterilizing liquid in the liquid waste for a predetermined period of time before disposing of the treated liquid waste; and one or more scales for determining the amount of liquid waste collected by the one or more liquid waste containers.

In some embodiments, the waste management system comprises a gravity-based liquid waste input; a vacuum-based liquid waste input operatively connected to a liquid aspirator and a liquid dispenser; a sterilizing liquid container operatively connected to at least one liquid waste container; two or more liquid waste containers disposed to alternatively accept liquid waste from said inputs, treat the liquid waste with a sterilizing liquid from said sterilizing liquid container, and incubate the sterilizing liquid in the liquid waste for a predetermined period of time before disposing of the treated liquid waste; one or more scales for determining the amount of liquid waste collected by the one or more liquid waste containers; and a flush system operatively connected to the gravity-based liquid waste input.

In some embodiments, the waste management system comprises a gravity-based liquid waste input; a vacuum-based liquid waste input operatively connected to a liquid aspirator and a liquid dispenser, a sterilizing liquid container operatively connected to at least one liquid waste container, two or more liquid waste containers disposed to alternatively accept liquid waste from said inputs, treat the liquid waste with a sterilizing liquid from said sterilizing liquid container, and incubate the sterilizing liquid in the liquid waste for a predetermined period of time before disposing of the treated liquid waste; one or more scales for determining the amount of liquid waste collected by the one or more liquid waste containers; a flush system operatively connected to the gravity-based liquid waste input; and a lag-lead pump system operable to pump the treated liquid waste out of the waste management system.

In some embodiments, the waste management system comprises a gravity-based liquid waste input; a vacuum-based liquid waste input operatively connected to a liquid aspirator and a liquid dispenser, a sterilizing liquid container operatively connected to at least one liquid waste container, two or more liquid waste containers disposed to alternatively accept liquid waste from said inputs, treat the liquid waste with a sterilizing liquid from said sterilizing liquid container, and incubate the sterilizing liquid in the liquid waste for a predetermined period of time before disposing of the treated liquid waste; one or more scales for determining the amount of liquid waste collected by the one or more liquid waste containers; a flush system operatively connected to the gravity-based liquid waste input; a lag-lead pump system operable to pump the treated liquid waste out of the waste management system; and one or more automatic pressure release valves.

In some embodiments, the waste management system comprises a first liquid waste input connected to a first liquid waste container; a second liquid waste input connected to the first liquid waste container and a second liquid waste container, and a valve operable to alternatively direct liquid waste from the second liquid waste input to the first liquid waste container or the second liquid waste container. In some embodiments, the second liquid waste input is operatively connected to a liquid dispenser.

In some embodiments, the waste management system comprises a first liquid waste input connected to a first liquid waste container; a second liquid waste input connected to the first liquid waste container and a second liquid waste container; a valve operable to alternatively direct liquid waste from the second liquid waste input to the first liquid waste container or the second liquid waste container, and a pump operable to actively pump waste from the second liquid waste input into the first liquid waste container or the second liquid waste container. In some embodiments, the second liquid waste input is operatively connected to a liquid dispenser.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents, patent applications, and publications referred to in this application are hereby incorporated by reference.

EXEMPLARY EMBODIMENTS

Embodiment 1

A reagent trough comprising:
a vessel comprising a bottom and a sidewall;
a high-level liquid sensor;
a low-level liquid sensor positioned to detect liquid at a lower level than the high-level liquid sensor;
a first liquid port positioned lower than the high-level liquid sensor; and
a second liquid port positioned lower than the first liquid port.

Embodiment 2

The reagent trough of embodiment 1, wherein the high-level liquid sensor or the low-level liquid sensor is positioned above the vessel and is configured to detect a liquid level in the vessel.

Embodiment 3

The reagent trough of embodiment 2, wherein the high-level liquid sensor or the low-level liquid sensor is an acoustic sensor or an optical sensor.

Embodiment 4

The reagent trough of embodiment 1, wherein the high-level liquid sensor or the low-level liquid sensor is positioned on the sidewall of the vessel.

Embodiment 5

The reagent trough of embodiment 4, wherein the high-level liquid sensor and the low-level liquid sensor is positioned on the sidewall of the vessel, and wherein the low-level liquid sensor is positioned below the high-level liquid sensor.

Embodiment 6

The reagent trough of embodiment 4 or 5, wherein the high-level liquid sensor contacts an inner face of the sidewall.

Embodiment 7

The reagent trough of any one of embodiments 4-6, wherein the high-level liquid sensor is a conductive sensor.

Embodiment 8

The reagent trough of any one of embodiments 4-6, wherein the high-level liquid sensor is a capacitive sensor.

Embodiment 9

The reagent trough of any one of embodiments 4-8, wherein the low-level liquid sensor does not contact an inner face of the sidewall.

Embodiment 10

The reagent trough of any one of embodiments 4-9, wherein the low-level liquid sensor is a capacitive sensor.

Embodiment 11

The reagent trough of any one of embodiments 4-8, wherein the low-level liquid sensor is a conductive sensor.

Embodiment 12

The reagent trough of any one of embodiments 4-11, wherein the second liquid port is positioned lower than the low-level liquid sensor.

Embodiment 13

The reagent trough of any one of embodiments 1-12, wherein the first liquid port is positioned on the sidewall of the vessel.

Embodiment 14

The reagent trough of any one of embodiments 1-13, wherein the second liquid port is positioned on the sidewall of the vessel.

Embodiment 15

The reagent trough of any one of embodiments 1-14, further comprising an overflow drain comprising an inlet and an outlet, the inlet positioned above the first liquid port.

Embodiment 16

The reagent trough of embodiment 15, wherein the high-level liquid sensor is on the sidewall of the vessel and the inlet of the overflow drain is positioned at the same level or above the high-level liquid sensor.

Embodiment 17

The reagent trough of embodiment 15 or 16, wherein the inlet of the overflow drain is perpendicular to the sidewall.

Embodiment 18

The reagent trough of any one of embodiments 15-17, wherein the outlet of the overflow drain is fluidly connected to a waste management system.

Embodiment 19

The reagent trough of any one of embodiments 1-18, wherein the high-level liquid sensor and the low-level liquid sensor are connected to a data port.

Embodiment 20

The reagent trough of any one of embodiments 1-19, wherein the first liquid port and the second liquid port are fluidly connected to a pump system.

Embodiment 21

A pump system comprising:
- a first liquid reservoir port connected to a first pump by a first conduit;
- a first junction connected to the first pump by a second conduit;
- a first liquid supply port connected to the first junction by a third conduit;
- a second liquid supply port connected to a second junction by a fourth conduit;
- a control valve connecting the first junction and the second junction;
- a second pump connected to the second junction by a fifth conduit; and
- a second liquid reservoir port connected to the second pump by a sixth conduit.

Embodiment 22

The pump system of embodiment 21, wherein the control valve is a stop flow valve.

Embodiment 23

The pump system of embodiment 21 or 22, further comprising a one-way valve disposed along the second conduit.

Embodiment 24

The pump system of any one of embodiments 21-23, further comprising a data port connected to the control valve.

Embodiment 25

The pump system of embodiment 24, wherein the data port is connected to the first pump and the second pump.

Embodiment 26

The pump system of any one of embodiments 21-25, further comprising a bubble sensor operable to detect bubbles in one or more of the conduits.

Embodiment 27

The pump system of embodiment 26, wherein the bubble sensor is operable to detect bubbles in the fourth conduit, the fifth conduit, or the sixth conduit.

Embodiment 28

The pump system of embodiment 26 or 27, wherein the bubble sensor is connected to the data port.

Embodiment 29

The pump system of any one of embodiments 24-28, wherein the data port is connected to a computer system comprising a microprocessor, wherein the computer system is operable to control the control valve, the first pump, or the second pump.

Embodiment 30

The pump system of any one of embodiments 21-29, wherein the pump system is contained within a housing.

Embodiment 31

The pump system of embodiments 30, wherein the pump system further comprises a spill sensor disposed within the housing.

Embodiment 32

The pump system of embodiment 31, wherein the spill sensor is connected to the data port.

Embodiment 33

A reagent delivery system comprising:
- the pump system of any one of embodiments 21-32;
- a liquid reservoir fluidly connected to the first liquid reservoir port and the second liquid reservoir port; and
- a reagent trough fluidly connected to the first liquid supply port and the second liquid supply port.

Embodiment 34

The reagent delivery system of embodiment 33, wherein the reagent trough comprises:
- a vessel comprising a bottom and a sidewall;
- a high-level liquid sensor;
- a low-level liquid sensor positioned to detect liquid at a lower level than the high-level liquid sensor;
- a first liquid port positioned lower than the high-level liquid sensor, wherein the first liquid port is fluidly connected to the second liquid supply port of the pump system; and
- a second liquid port positioned lower than the first liquid port, wherein the second liquid port is fluidly connected to the first liquid supply port of the pump system.

Embodiment 35

The reagent delivery system of embodiment 34, wherein the high-level liquid sensor or the low-level liquid sensor is positioned above the vessel and is configured to detect a liquid level in the vessel.

Embodiment 36

The reagent delivery system of embodiment 35, wherein the high-level liquid sensor or the low-level liquid sensor is an acoustic sensor or an optical sensor.

Embodiment 37

The reagent delivery system of embodiment 34, wherein the high-level liquid sensor or the low-level liquid sensor is positioned on the sidewall of the vessel.

Embodiment 38

The reagent delivery system of embodiment 37, wherein the high-level liquid sensor and the low-level liquid sensor is positioned on the sidewall of the vessel, and wherein the low-level liquid sensor is positioned below the high-level liquid sensor.

Embodiment 39

The reagent delivery system of embodiment 37 or 38, wherein the high-level liquid sensor contacts an inner face of the sidewall.

Embodiment 40

The reagent delivery system of any one of embodiments 37-39, wherein the high-level liquid sensor is a conductive sensor.

Embodiment 41

The reagent delivery system of any one of embodiments 37-39, wherein the high-level liquid sensor is a capacitive sensor.

Embodiment 42

The reagent delivery system of any one of embodiments 37-41, wherein the low-level liquid sensor does not contact an inner face of the sidewall.

Embodiment 43

The reagent delivery system of any one of embodiments 37-42, wherein the low-level liquid sensor is a capacitive sensor.

Embodiment 44

The reagent delivery system of any one of embodiments 37-41, wherein the low-level liquid sensor is a conductive sensor.

Embodiment 45

The reagent delivery system of any one of embodiments 37-44, wherein the second liquid port is positioned lower than the low-level liquid sensor.

Embodiment 46

The reagent delivery system of any one of embodiments 34-45, wherein the first liquid port is positioned on the sidewall of the vessel.

Embodiment 47

The reagent delivery system of any one of embodiments 34-46, wherein the second liquid port is positioned on the sidewall of the vessel.

Embodiment 48

The reagent delivery system of any one of embodiments 34-47, further comprising an overflow drain comprising an inlet and an outlet, the inlet positioned above the first liquid port.

Embodiment 49

The reagent delivery system of embodiment 48, wherein the high-level liquid sensor is on the sidewall of the vessel and the inlet of the overflow drain is positioned at the same level or above the high-level liquid sensor.

Embodiment 50

The reagent delivery system of embodiment 48 or 49, wherein the inlet of the overflow drain is perpendicular to the sidewall.

Embodiment 51

The reagent delivery system of any one of embodiments 48-50, wherein the outlet of the overflow drain is fluidly connected to a waste management system.

Embodiment 52

The reagent delivery system of any one of embodiments 34-51, wherein the high-level liquid sensor and the low-level liquid sensor are connected to a data port.

Embodiment 53

The reagent delivery system of any one of embodiments 34-52, wherein the high liquid sensor and the low liquid sensor are connected to a computer system comprising a microprocessor.

Embodiment 54

The reagent delivery system of any one of embodiments 34-53, wherein the pump system is operable to pump a liquid contained within the liquid reservoir to the reagent trough upon the low-level liquid sensor detecting an absence of liquid.

Embodiment 55

The reagent delivery system of embodiment 54, wherein the liquid is pumped into the reagent trough through the second liquid port of the reagent trough.

Embodiment 56

The reagent delivery system of embodiment 54 or 55, wherein the first pump is active and the control valve is closed upon the low-level liquid sensor detecting an absence of liquid.

Embodiment 57

The reagent delivery system of embodiment 56, wherein the second pump is active upon the low-level liquid sensor detecting an absence of liquid.

Embodiment 58

The reagent delivery system of embodiment 57, wherein the first pump and the second pump are deactivated upon the bubble sensor detecting bubbles in one or more of the conduits in the pump system.

Embodiment 59

The reagent delivery system of any one of embodiments 34-58, wherein the pump system is operable to drain a liquid contained within the reagent trough to the liquid reservoir upon the high-level liquid sensor detecting a liquid.

Embodiment 60

The reagent delivery system of embodiment 59, wherein the liquid is actively drained by the pump system.

Embodiment 61

The reagent delivery system of embodiment 59 or 60, wherein the liquid is drained from the reagent trough through the first liquid port of the reagent trough.

Embodiment 62

The reagent delivery system of any one of embodiments 59-61, wherein the second pump is activated and the control valve is open upon the high-level liquid sensor detecting the liquid.

Embodiment 63

The reagent delivery system of any one of embodiments 33-62, wherein the pump system is operable to recirculate liquid in the reagent trough by simultaneously pumping the liquid from the liquid reservoir to the reagent trough and pumping the liquid from the reagent trough to the liquid reservoir.

Embodiment 64

The reagent delivery system of embodiment 63, wherein the liquid is pumped into the reagent trough through the second liquid port of the reagent trough, and the liquid is pumped out of the reagent trough through the first liquid port of the reagent trough during recirculation of the liquid.

Embodiment 65

The reagent delivery system of embodiment 63 or 64, wherein the first pump and the second pump are active and the control valve is closed during recirculation of the liquid.

Embodiment 66

The reagent delivery system of any one of embodiments 63-65, wherein the pump system is operable to recirculate the liquid for a predetermined period of time.

Embodiment 67

The reagent delivery system of embodiment 66, wherein the pump system is operable to recirculate the liquid at a predetermined frequency.

Embodiment 68

The reagent delivery system of any one of embodiments 33-67, further comprising a pipette system.

Embodiment 69

The reagent delivery system of embodiment 68, wherein the pipette system is a multi-channel pipette system.

Embodiment 70

The reagent delivery system of embodiment 68 or 69, wherein the pipette system is operable to draw a liquid from the reagent trough and dispense a liquid waste into a liquid waste input of a waste management system.

Embodiment 71

The reagent delivery system of embodiment 70, wherein the liquid waste input is a gravity-based liquid waste input.

Embodiment 72

The reagent delivery system of embodiment 71, wherein the gravity-based liquid waste input comprises a vessel and a lid comprising a plurality of apertures.

Embodiment 73

The reagent delivery system of any one of embodiments 70-72, wherein the waste management system further comprises:
  a vacuum-based liquid waste input; and
  two or more liquid waste containers disposed to alternatively accept liquid waste from the gravity-based liquid input or the vacuum-based liquid waste input.

Embodiment 74

The reagent delivery system of embodiment 73, wherein the waste management system further comprises a pump fluidly connected to the vacuum-based liquid waste input.

Embodiment 75

The reagent delivery system of embodiment 73 or 74, wherein the waste management system further comprises a sterilizing liquid container operatively connected to at least one liquid waste container.

Embodiment 76

The reagent delivery system of embodiment 75, wherein the waste management system is operable to treat the liquid waste with a sterilizing liquid from said sterilizing liquid container, and incubate the sterilizing liquid in the liquid waste for a predetermined period of time before disposing of the treated liquid waste.

Embodiment 77

The reagent delivery device of any one of embodiments embodiment 73-76, wherein the waste management system further comprises one or more scales for determining the amount of liquid waste collected by the one or more liquid waste containers.

Embodiment 78

The reagent delivery system of any one of embodiments 70-72, wherein the waste management system further comprises:
  a first liquid waste container operatively connected to the liquid waste input;
  a second liquid waste input operable to alternatively flow a second liquid waste into the first waste container or a second waste container.

Embodiment 79

A waste management system comprising:
  a gravity-based liquid waste input;

a vacuum-based liquid waste input operatively connected to a liquid aspirator and a liquid dispenser;

a sterilizing liquid container operatively connected to at least one liquid waste container;

two or more liquid waste containers disposed to alternatively accept liquid waste from said inputs, treat the liquid waste with a sterilizing liquid from said sterilizing liquid container, and incubate the sterilizing liquid in the liquid waste for a predetermined period of time before disposing of the treated liquid waste; and one or more scales for determining the amount of liquid waste collected by the one or more liquid waste containers.

Embodiment 80

The waste management system of embodiment 79, wherein the waste-management system further comprises a flush system operatively connected to the gravity-based liquid waste input.

Embodiment 81

The waste management system of embodiment 79 or 80, wherein the waste management system comprises a lead-lag pump system operable to pump the treated liquid waste out of the waste management system.

Embodiment 82

The waste management system of any one of embodiments 79-81, wherein the waste management system further comprises one or more automatic pressure release valves.

Embodiment 83

A waste management system comprising:
a first liquid waste input connected to a first liquid waste container;
a second liquid waste input connected to the first liquid waste container and a second liquid waste container; and
a valve operable to alternatively direct liquid waste from the second liquid waste input to the first liquid waste container or the second liquid waste container.

Embodiment 84

The waste management system of embodiment 83, wherein the waste management system further comprises a pump operable to actively pump waste from the second liquid waste input into the first liquid waste container or the second liquid waste container.

Embodiment 85

The waste management system of embodiment 83 or 84, wherein the second liquid waste input is operatively connected to a liquid dispenser.

Embodiment 86

The waste management system of any one of embodiments 83-85, wherein the first liquid waste input comprises a vessel and a lid comprising a plurality of apertures.

The invention claimed is:

1. A reagent trough comprising:
a vessel comprising a bottom and sidewalls;
a high-level liquid sensor;
a low-level liquid sensor positioned to detect liquid at a lower level than the high-level liquid sensor;
a first liquid port positioned lower than the high-level liquid sensor;
a second liquid port positioned lower than the first liquid port; and
a pump system comprising a first liquid supply port and a second liquid supply port;
wherein the first liquid port is fluidly connected to the second liquid supply port of the pump system and the second liquid port is fluidly connected to the first liquid supply port of the pump system.

2. The reagent trough of claim 1, wherein the high-level liquid sensor or the low-level liquid sensor is positioned above the vessel and is configured to detect a liquid level in the vessel.

3. The reagent trough of claim 2, wherein the high-level liquid sensor or the low-level liquid sensor is an acoustic sensor or an optical sensor.

4. The reagent trough of claim 1, wherein the high-level liquid sensor or the low-level liquid sensor is positioned on the sidewall of the vessel.

5. The reagent trough of claim 1, wherein the high-level liquid sensor is a conductive sensor or a capacitive sensor.

6. The reagent trough of claim 1, further comprising an overflow drain comprising an inlet and an outlet, the inlet positioned above the first liquid port.

7. The reagent trough of claim 6, wherein the outlet of the overflow drain is fluidly connected to a waste management system.

8. The reagent trough of claim 1, wherein the high-level liquid sensor and the low-level liquid sensor are connected to a data port.

9. The reagent trough of claim 1, wherein the pump system further comprising:
a first liquid reservoir port connected to a first pump by a first conduit;
a first junction connected to the first pump by a second conduit;
the first liquid supply port connected to the first junction by a third conduit;
the second liquid supply port connected to a second junction by a fourth conduit;
a control valve connecting the first junction and the second junction;
a second pump connected to the second junction by a fifth conduit; and
a second liquid reservoir port connected to the second pump by a sixth conduit.

10. The reagent trough of claim 9, wherein the control valve is a stop flow valve.

11. The reagent trough of claim 9, further comprising a data port connected to the control valve, the first pump, or the second pump.

12. The reagent trough of claim 9, wherein the pump system is contained within a housing.

13. The reagent trough of claim 12, wherein the pump system further comprises a spill sensor disposed within the housing.

* * * * *